United States Patent
Fitzgerald et al.

(10) Patent No.: US 12,440,589 B2
(45) Date of Patent: Oct. 14, 2025

(54) STERILISATION ASSEMBLY

(71) Applicant: RANDOX LABORATORIES LTD, Crumlin (GB)

(72) Inventors: Peter Fitzgerald, Crumlin (GB); David Sloan, Crumlin (GB); Martin Reid, Crumlin (GB); Stuart Jackson, Crumlin (GB)

(73) Assignee: RANDOX LABORATORIES LTD, Crumlin (GB)

( * ) Notice: Subject to any disclaimer, the term of this patent is extended or adjusted under 35 U.S.C. 154(b) by 776 days.

(21) Appl. No.: 17/602,831

(22) PCT Filed: Apr. 9, 2020

(86) PCT No.: PCT/GB2020/050931
§ 371 (c)(1),
(2) Date: Oct. 11, 2021

(87) PCT Pub. No.: WO2020/208364
PCT Pub. Date: Oct. 15, 2020

(65) Prior Publication Data
US 2022/0152244 A1    May 19, 2022

(30) Foreign Application Priority Data
Apr. 12, 2019   (GB) ..................................... 1905196

(51) Int. Cl.
*G01N 35/00*   (2006.01)
*A61L 2/10*    (2006.01)

(52) U.S. Cl.
CPC ............ *A61L 2/10* (2013.01); *G01N 35/0099* (2013.01); *A61L 2202/11* (2013.01); *G01N 2035/00326* (2013.01)

(58) Field of Classification Search
CPC .......... A61L 2/10; A61L 2202/11; A61L 2/26; G01N 2035/00326; G01N 35/00; G01N 35/0099
See application file for complete search history.

(56) References Cited

U.S. PATENT DOCUMENTS

| 5,072,487 | A | 12/1991 | Walton |
| 2011/0108143 | A1* | 5/2011 | Caluori ................ A61C 17/125 134/169 C |

(Continued)

FOREIGN PATENT DOCUMENTS

| EP | 2050471 A1 | 4/2009 |
| EP | 2292728 A1 | 3/2011 |

(Continued)

OTHER PUBLICATIONS

Aug. 30, 2023—(EP)—Office Action—App 20719708.8.

(Continued)

*Primary Examiner* — Dean Kwak
(74) *Attorney, Agent, or Firm* — Banner & Witcoff, Ltd.

(57) ABSTRACT

There is provided a sterilisation assembly for a molecular diagnostic assay analyse. The assembly comprising: an enclosure having a passage therethrough, the passage being arranged in use to allow an assay sample set to pass through the enclosure, the enclosure defining a barrier adapted in use to restrict fluid communication across the enclosure to communication through the passage; and a decontaminator located within the passage, the decontaminator is arranged in use to sterilise contamination in the passage.

23 Claims, 12 Drawing Sheets

(56) References Cited

U.S. PATENT DOCUMENTS

| | | | |
|---|---|---|---|
| 2013/0283733 A1* | 10/2013 | Py | B65B 55/04 |
| | | | 53/425 |
| 2015/0037803 A1 | 2/2015 | Park et al. | |
| 2015/0079655 A1* | 3/2015 | Laugharn, Jr. | G01N 1/34 |
| | | | 435/306.1 |
| 2015/0093786 A1 | 4/2015 | Thieme et al. | |
| 2016/0296649 A1* | 10/2016 | Ramanand | A61L 2/10 |
| 2021/0023250 A1* | 1/2021 | Golkowski | C01B 15/01 |

FOREIGN PATENT DOCUMENTS

| | | |
|---|---|---|
| KR | 2013-0052402 A | 5/2013 |
| WO | 2013/016248 A1 | 1/2013 |

OTHER PUBLICATIONS

Aug. 24, 2020—(WO) International Search Report & Written Opinion—App. No. PCT/GB2020/050931.
Aug. 19, 2019—(GB) Search Report—App. No. 1905196.0.
Jun. 5, 2025—(EP)—Examination Report—App 20719708.8.

* cited by examiner

STERILISATION ASSEMBLY

CROSS-REFERENCE TO RELATED APPLICATIONS

This application is a U.S. National Stage application under 35 U.S.C. § 371 of International Application PCT/GB2020/050931 (published as WO 2020/208364 A1), filed Apr. 9, 2020, which claims the benefit of priority to United Kingdom Patent Application No. 1905196.0, filed Apr. 12, 2019. Benefit of the filing date of each of these prior applications is hereby claimed. Each of these prior applications is hereby incorporated by reference in its entirety.

FIELD OF THE INVENTION

The present invention relates to an analyser and a sterilisation assembly, the analyser and sterilisation assembly typically being suitable for conducting all or part of an assay, such as a molecular diagnostic assay.

INTRODUCTION

Identifying content of a sample is important to many industries. This is because it allows analysis of items such as food, chemicals, pharmaceuticals, human and animal body fluids and drugs for quality control, safety testing, diagnostics, toxicology and a number of other applications.

Regardless of what type of sample is to be analysed and the application, the same general process is able to be carried out to reach the end result of identifying various constituents of a sample. This process is to purify the sample, accumulate sufficient quantities of the purified sample to be able to test it and then to carry out a detection process. Such a process is typically called an "assay", which has various steps that are carried out to achieve the end result.

One process used to diagnose and monitor disease and to assist in identifying particular therapies to provide to a patient based on the risk each therapy would pose and how effective each therapy is expected to be is molecular diagnostics. This is an analysis of biological markers (also referred to as biomarkers) in the DNA and RNA of a sample.

In a molecular diagnostics assay the typical process involves extracting and purify DNA and RNA from a sample being tested. To achieve this, normally a lysis process is carried out to breakdown cell membranes in a sample provided. Any further steps can then be carried out to isolate and purify the DNA and/or RNA material as needed.

Following this, the extracted DNA and/or RNA is amplified by a Polymerase Chain Reaction (PCR) process. This ensures there is sufficient genetic material available to allow reliable detection to be carried out.

After the PCR is carried out, detection is carried out to identify various constituents of the amplified sample. One way to achieve this is by the use of biochips. These make use of biochemical reactions between the amplified sample and various chemicals immobilised on the biochip when the sample is placed on the biochip.

Due to the increasing sensitivity of these assays, avoiding contamination is becoming ever more important. This means that assays are frequently run in laboratories free from as many contaminants as possible. However, this only limits external contaminants. The possibility of cross contamination between different sample sets is still high even if an assay is performed in a suitably prepared laboratory. This typically means that only a single sample set is tested at any one time. Since carrying out a complete assay on a sample set takes a significant period of time, this reduces throughput due to the practical limits on the number of samples that can be tested.

There is therefore a need to increase throughput of samples whilst limiting cross contamination between sample sets.

SUMMARY OF INVENTION

According to a first aspect, there is provided a sterilisation assembly for (for example, suitable for) a molecular diagnostic assay analyser, the assembly comprising: an enclosure having a passage therethrough, the passage being arranged in use to allow an assay sample set to pass through the enclosure, the enclosure defining a barrier adapted in use to restrict fluid communication across the enclosure to communication through the passage; and a decontaminator located within the passage, the decontaminator is arranged in use to sterilise contamination in the passage.

When the sterilisation assembly of the first aspect is used, since fluid communication, such as liquid and/or gaseous communication, is restricted to passing through the enclosure due to the barrier provided, instead of being able to pass around the enclosure, the passage of any contamination across the enclosure is limited to passing through the passage. This is because any contamination will either be carried by gaseous communication, such as airborne contamination, or in liquid form. The decontaminator is then able to be used to limit contamination passing across the enclosure. This means that by using a sterilisation assembly according to the first aspect, a sample set is able to be processed on one side of the enclosure while a further sample set is able to be processed on the other side of the enclosure without the risk of cross contamination. This at least doubles the number of samples sets that can be processed, significantly increasing the sample turnover without increasing the risk of samples being contaminated.

By the phrases "communication through" and "communication across" in relation to the enclosure, it is intended to mean that "communication through" relates to the ability to pass through an interior of the enclosure from an exterior of the enclosure, for example through the passage and "communication across" relates to a more general ability (or, for example, the lack thereof in the first aspect) of passing from the one side of the enclosure to an opposing side of the enclosure.

Typically, the passage may be defined by a tunnel forming part of the enclosure. This allows samples to be passed from one opening in the tunnel to another with a separation between the two openings instead of being loaded into the enclosure and unloaded from the enclosure in the same location. This further reduces the possibility of contamination by separating the locations from which a sample set is loaded and unloaded to and from the enclosure.

An inwardly facing surface of the tunnel may be a condensating surface. This causes any airborne contamination, such as particles entrained in any gaseous communication, to become stuck to the inwardly facing surface of the tunnel when such contamination comes into contact with said surface. This immobilises the contamination allowing it to be sterilised more easily and further reducing the risk of contamination passing through the in to the passage and then out of the passage in a different location.

The ability of the inwardly facing surface of the tunnel to act as a condensating surface may be provided by any suitable means, such as cooling the surface to cause gas to liquefy or solidify on the surface. Typically, the inwardly facing surface of the tunnel is polyurethane. This provides a non-smooth surface due to the natural roughness of polyurethane. The roughness causes airborne particles to become trapped on the surface providing the benefit of the condensating surface with minimal additional components, thereby reducing component count and simplifying the condensating process to limit wear.

Each sample set may be passed through the passaging in any suitable means, such as by a mechanical arm located outside the passage that is arranged to pass a sample set through the passage. Typically however, the assembly further comprises a moveable stage on to which at least one sample is removably mountable in use. This further allows there to be distance between where the sample is loaded into the passage and where the sample is unloaded from the passage and allows only components of the enclosure to be used to transfer a sample set through the passage. This further limits the risk of cross contamination between sample sets.

The assembly may further comprise an elevated platform in the passage, wherein the stage may be connected to an electrical cable, the cable passing under the elevated platform. By the term "under" it is intended to mean that the stage is located on one side of the elevated platform and the cable is located on an opposing side of the elevated platform, the side of the platform on which the stage is located typically being an upper or upwardly facing surface of the platform. By passing the cable under the elevated platform, the cable is kept separated from the stage. This avoids the chance of the stage becoming entangled with the cable due to any movement of the cable as the stage moves.

The cable may be configured in any suitable manner. Typically, the cable may have a swivel joint. This reduces the likelihood of the cable bending or kinking as the stage moves. Accordingly, this reduces fatigue and wear on the cable as it is used.

The stage may be moveable by any suitable means and along any path wanted. Typically, the stage may be arranged in use to move along a rail. This allows the stage to move in a smooth, repeatable manner through the passage making transport of each sample set reliable. Of course, the rail may be mounted to the platform.

The assembly may further comprise a drive mechanism arranged in use to move the stage. This allows automated movement of the stage thereby limiting the need for user interaction with the assembly and the associated contamination risk.

The drive mechanism may be a direct drive mechanism, such as a mechanism that engages with the rail when the stage is mounted to a rail, or may be an X-Y stage. Typically however, the drive mechanism may comprise a belt to which the stage is attached. This allows a simple motor to be used to move the stage. Furthermore, using a belt is more robust and hard wearing than a direct drive system that engages with a rail. This is because a smaller number of components are used when a belt is used, and the complexity of the components is reduced since the components need to be less intricate as there is no need for them to engage the rail. Additionally, using a belt allows for modular construction of the assembly; this is because the drive mechanism and stage can be installed at different stages of the manufacturing process of the assembly.

The decontaminator may take any suitable form and may be located at any location within the passage that allows sterilisation of contamination. Typically, the decontaminator may be attached to the stage. This allows the decontaminator to move with the stage, meaning that sterilisation can be applied throughout the passage without needing the decontaminator to be of a sufficient size itself to span the whole of the passage. This simplifies the decontaminator and makes maintenance simpler while allowing suitable sterilisation to be provided.

The decontaminator may be attached to any section of the stage. Typically, the stage may be arranged in use to move along a path, the stage being orientated with at least on side crossing the path, wherein the decontaminator may be attached at a side of the stage crossing the path. This reduces the amount of space needed for the stage when the decontaminator is attached to the stage. Should the decontaminator be attached at a side of the stage parallel to the path, this would widen the stage, meaning the passage needs to be wider in order to permit the stage to travel through the passage. However, with the stage attached at a side of the stage crossing the path, this space adjacent the stage is not needed, so the passage can be narrower. This allows the overall size of the assembly to be smaller.

The stage may be moveable between a first position, such as a sample loading position, and a second position, such as sample unloading position. When the stage is located at the first position, the side of the stage at which the decontaminator is attached may be distal to the second position. Of course, there may be a (physical) separation between the first position and the second position. When the first position is a sample loading position and the second position is a sample unloading position, since there may be more contamination produced from the area the sample set is loaded from than the area to which the sample set is unloaded and the presence of contamination poses a greater risk at a sample loading position due to the high severity of contamination potentially becoming entrained in the sample at this stage causes, the decontaminator being located on the side of the stage set out above provides a greater ability to sterilise contamination from the area from which the sample set is loaded. As such, the decontaminator being attached to the stage as set out above allows contamination to be removed from areas most at risk from contamination.

The passage may need to be accessible by a user and may need to be accessible to allow sample sets to be loaded into the passage and to be unloaded from the passage. In order to allow access, openings may need to be provided. To allow suitable access, the openings may need to be larger than a pair of hands for example. Typically however, the passage may be accessible by one or more openings, wherein each opening may have an area of less than or equal to the area of an upper surface of the stage. By limiting the size of the openings in this manner, this encourages turbulent airflow of any air or other gas entering the passage through any opening and also limits the amount of contamination that can enter the passage through the openings. By encouraging turbulence, airborne contamination is more likely to be moved to a location where it is easier to sterilise it due to the additional movement and the reduced speed of travel. Additionally, by limiting the amount of contamination that can enter the passage, this reduces the amount of sterilisation needed, making the sterilisation more likely to sterilise all the possible contamination. By the term "airflow" we intend to mean flow of air and flow of gas (for example gas other than air).

The passage may follow any wanted path. For example, the path may be straight. Typically, the path may include at least one turn. This encourages turbulent flow since and air or gas passing through the passage must pass around the turn causing it to change direction and therefore increase the likelihood of mixing within the gas.

The turn may change the direction of the passage by an angle greater than an acute angle. By this we intend to mean that the angle between a straight line along which the passage would have continued to travel without the turn being present from a point further along that line than the turn and the direction in which the passage is caused to travel by the turn is an angle greater than an acute angle. This further encourages turbulent flow by placing a greater restriction on airflow in the passage.

Typically, the turn may be U shaped. This allows the path to be kept compact by reducing its overall length compared to a straight path while also providing a path that encourages turbulent flow due to the change in direction of the passage.

The assembly may further comprise a pump arranged to move gas within the passage. This allows airflow within the passage to be directed thereby reducing contamination by causing the airflow to move in a directed manner instead of to naturally flow where it could pass into a location where it causes contamination.

Typically, the enclosure may include an outlet connected to the pump. Of course, the outlet may also be arranged to provide an outlet to the assembly. This allows gas to be moved out of the enclosure (and assembly) by creating airflow out of the enclosure (and assembly) instead of directing it elsewhere, such as towards where samples are processed outside of the enclosure or assembly. Accordingly, this assists in limiting passage of contamination to areas where samples are processed.

The outlet may comprise a filter. This limits contamination being direct out of the enclosure (and assembly) by removing contamination from any gas passing through the outlet.

Typically, the enclosure may include an inlet connected to the pump. Of course, the inlet may also be arranged to provide an inlet to the assembly. This allows gas to be brought into the enclosure and to be entrained in any existing airflow. This provides mixing of air to dilute any contamination and encourages turbulence to make capturing contamination more likely.

The inlet may comprise a filter. This limits dust intake and intake of any external contamination.

The pump may be any form of pump, such as a piston. Typically however, the pump may comprise at least one fan. This allows the pump to be a simple mechanism that is easy to maintain and replace when necessary.

The decontaminator may provide sterilisation in any form, such as by heat or chemical sterilisation. Typically, the decontaminator may be arranged in use to produce electromagnetic radiation to provide radiation sterilisation. This form of sterilisation provides effective sterilisation of organic matter by causing the organic matter to become inactive.

The radiation sterilisation may be provided by electromagnetic radiation in the form of ionising radiation, such as gamma radiation, beta radiation or X-ray radiation. Typically however, the electromagnetic radiation is ultraviolet C (UVC) radiation. This is less harmful to humans than ionising radiation while still being effective at sterilising organic matter by destroying nucleic acids. This allows effective sterilisation to be provided.

The assembly may be arranged in use to carry out PCR amplification on a sample set while the sample set is in the passage. This allows the samples to be processed while also passing through the passage thereby allowing a sample set to be processed on either side of the assembly while also processing a sample set. This further increases the sample turnover possible by using the analyser while maintaining the same level of sterilisation to minimise contamination between samples.

According to a second aspect, there is provided a sample analyser for (for example, suitable for) carrying out a molecular diagnostic assay, the analyser comprising: a first zone, a second zone and a third zone, within which steps of an assay are conducted on at least one sample set in use, fluid communication within the analyser between the first zone and third zone being provided through the second zone, a sample set being moveable in use between the first zone and the second zone and between the second zone and the third zone; and a sterilisation assembly located between the first and third zones, the assembly being arranged in use to sterilise contamination passing out of the third zone to at least one of the other zones.

As with the assembly of the first aspect, since fluid communication, such as liquid and/or gaseous communication, is restricted to passing through the second zone, instead of being able to pass around the second zone, the passage of any contamination across the second zone is limited to passing through the second zone. This is because any contamination will either be carried by gaseous communication, such as airborne contamination, or in liquid form. The sterilisation assembly of the second aspect is then able to be used to limit contamination passing between the first zone and the third zone. This means that by using the sterilisation assembly according to the second aspect, a sample set is able to be processed in one of the first and third zones while a further sample set is able to be processed on the other of the first and third zones without the risk of cross contamination. This at least doubles the number of samples sets that can be processed, significantly increasing the sample turnover without increasing the risk of samples being contaminated.

Typically the sterilisation assembly may be located in the second zone. This keeps the analyser compact and allows sterilisation to be carried out without needing further zones between the first, second and third zones.

The second zone may include an enclosure, the enclosure providing a barrier between the second zone and each of the first zone and third zone. This allows the first, second and third zones to be within a single analyser (i.e. within a single enclosed space) within a laboratory or other suitable room. This minimises the extent of any contamination produced when processing samples.

A sample set may be moveable between the first or third zone and the second zone by the user or by any suitable means. Typically, the sample set is moveable between the first zone and the second zone and/or between the second zone and third zone by a programmable translation system. This avoids user error when moving a sample set as well as avoiding mistakes such as samples being dropped and causing contamination. Additionally, the programmable translation system provides a predictable and repeatable movement. Accordingly, reliable movement is provided that also limits the potential to cause contamination when moving a sample set.

The programmable translation system may be a robotic arm, such as a Cartesian or gantry robot or an articulated robot. This provides dexterity in the movement of the translation system, which allows a smaller space to be used than with other programmable translation systems while still providing the range of movement needed to move a sample set between the zones.

The analyser may further comprise a controller arranged in use to run an assay in the analyser within the first zone, second zone and third zone. This allows the assay to be run from beginning to end on a sample set without intervention of a user in the assay process. This limits the likelihood of a user causing contamination.

The zones may each only be accessible from a single location. Typically however, each zone is accessible from an exterior of the analyser. This allows individual elements to be provided to each zone. This limits contamination since only the sample needs to be moved within the analyser and all other elements used in an assay can be loaded into, and kept within, the zone in which they are used.

Typically the first zone may be arranged in use to conduct sample extraction, and/or the second zone may be arranged in use to conduct Polymerase chain reaction (PCR), and/or the third zone may be arranged in use to conduct sample detection.

While the sterilisation assembly of the second aspect may by any suitable system, the sterilisation assembly of the second aspect may be the sterilisation assembly of the first aspect.

According to a third aspect, there is provided a method of conducting a molecular diagnostic assay, the method comprising: passing a sample through a passage in a barrier of an analyser, the barrier restricting fluid communication across the barrier to communication through the passage; and sterilising the passage to sterilise contamination in the passage.

The method of the third aspect may provide the same benefits as the assembly of the first aspect.

Typically, to pass the sample through the passage, the sample is moved from a first position, such as loading position, to a second position, such as an unloading position, each position being on opposing sides of the barrier. This limits cross contamination due to the separation of the positions.

The sample may be moved on a stage. Additionally, the stage may comprise a decontaminator, the decontaminator providing the sterilisation of the passage. This allows sterilisation to be provided while keeping the size of the element providing the sterilisation small. This means less servicing and maintenance is needed.

The sample may be transferred through the passage in a sample holder provided from another zone. Typically however, the sample is transferred into at least one cartridge to pass through the passage. This limits the possibility of contamination as the cartridge is within the passage, instead of being a holder that was previously held elsewhere that could have become contaminated during the earlier processing of the sample.

Typically, when the decontaminator is provided on the stage, the at least one cartridge may be loaded on to the stage when the stage is in a third position, the stage moving from the third position to the first position to the second position, the stage then moves through the passage with the decontaminator providing sterilisation, wherein the first position is a loading position, and the second position is an unloading position. This provides access to the stage whilst also causing the stage to pass along the passage to sterilise the passage. This limits the amount of energy used by sterilisation but maximises the sterilisation provided.

According to a fourth aspect, there is provided a method of conducting a molecular diagnostic assay, the method comprising: conducting an assay on a sample in an analyser, steps of the assay being carried out in a respective first zone, second zone and third zone within the analyser, the sample being transferred by the analyser between the first and second zones and between the second and third zones, fluid communication within the analyser between the first zone and third zone being provided through the second zone; and sterilising contamination passing out of the third zone to at least one of the other zones.

The method of the fourth aspect may provide the same benefits as the analyser of the second aspect.

The sterilising of the contamination may be conducted in the second zone. This keeps the analyser compact and allows sterilisation to be carried out without needing further zones between the defined first, second and third zones.

Typically, gas may be drawn through the second zone to an exterior of the analyser while conducting the assay. This draws gas into the second zone due to the gas being drawn through the second zone needing to be replaced by other air. This is able to be achieved without directing the gas into another zone. This reduces cross contamination by directing gas away from the other zones.

According to a fifth aspect, there is provided a linear motion system comprising: a track and a carriage moveably mounted to the track; and a bracket arranged in use to support an end of a cable connected to the carriage, wherein the bracket and carriage are a kinematic pair.

The bracket and carriage forming a kinematic pair allows relative movement between the bracket and carriage to alter the orientation of the bracket relative to the carriage. This gives the cable end supported by the bracket the ability of changing orientation relative to the carriage. This ability for the cable end to change orientation relative to the carriage allows the arrangement of the cable along the length of the cable to be determined only by the characteristics of the cable (such as the materials it is made of, its diameter, its minimum bend radius and/or its composition). This is instead of the position of the carriage affecting the arrangement of the cable as would be the case if the orientation of cable end was fixed relative to the carriage.

For example, with a cable end held in a fixed orientation relative to the carriage, to avoid damaging the cable, the cable arrangement must adapt to the position of the carriage on the track (such as to avoid reducing the radius of a bend in the cable to a radius smaller than a minimum bend radius of the cable). On the other hand, with a cable end having a moveable orientation relative to the carriage, the cable arrangement is able to adapt to avoid damaging the cable. This is due to the cable end being able to change orientation to allow the cable to move (or "flex") so as not to exceed the tolerance of any characteristic of the cable. Accordingly, this reduces the size of the envelope required by the system since the cable is not pushed into a particular arrangement by movement of the carriage and is instead able to re-arrange itself to adapt to the carriage movement.

It is intended that the bracket is connected to the carriage as well as an end of a cable (also referred to as a cable end) being connected to the carriage.

Linear motion systems may also be referred to as motion systems, linear track systems, (linear) stage systems, (linear) slider systems and/or (linear) guide and carriage systems.

The linear motion system may further comprise a cable connected to the carriage at one end and connected to a cable fixing at an opposing end, the cable being free to bend and flex (such as by moving) on movement of the carriage. The cable fixing may be a connector or may simply be a device holding a cable end in place.

The cable may be un-guided. By the term "un-guided" we intend to mean that the cable is able to move freely, such as without being constrained by a cable carrier, cable chain or cable guide. This reduces component count and avoids the cable becoming damaged by any such carrier kinking or bending or from becoming artificially shortened by such kinking.

There may be one or more cables, such as a plurality of cables (for example seven or more cables). Typically, the cable may be only a single cable. This reduces the likelihood of the cable snagging or becoming tangled during use compared to when multiple cables are used.

The cable may be a single core cable. Typically the cable may be a multicore cable, such as a twisted pair cable, or a cable with multiple cores or multiple twisted pairs. Using a multicore cable allows a smaller overall diameter of cable than if one cable were used per core or per twisted pair. This provides a greater ability to control movement of the cable during use of the system while also allowing connections to multiple inputs, such as multiple components.

When the cable is a multicore cable, the cores may be kept together to connect to a single connector or single input port. Typically however, the cores of the cable may separate between the bracket and the carriage. This allows the cores to connect to multiple connectors and/or to multiple components to allow those components to each be controlled or operated while only using a single cable.

The bracket and carriage being a kinematic pair may be enabled by a joint connected between the bracket and carriage, the joint being arranged in use to allow relative movement between the bracket and carriage.

The joint may cause the kinematic pair to be a higher pair or a lower pair, if a lower paid, the joint may be a prismatic joint, screw joint, cylindrical joint, spherical joint or planar joint. Typically however, the joint may be a revolute joint. This allows one degree of freedom movement of the bracket relative to the carriage reducing the likelihood of failure over joints providing more degrees of freedom and thereby reduces the need for maintenance of the system while also not changing the overall length of the kinematic pair along an axis passing along the rotational axis of the joint.

The ability of the joint to allow movement may be provided by any suitable means. Typically the joint may include a bearing. This provides a simple and easily maintained component that provides the ability for the joint to allow movement of the bracket relative to the carriage.

The bearing may be an oil-free self-lubricating bearing. This reduces the need for maintenance of the bearing since there is no need for replacing oil. Additionally, when used in environments that require minimal contamination, the bearing being oil free avoids contamination from oil.

The bracket may only support the cable end, such as by providing one or more surfaces against which the cable abuts in use. The bracket may be arranged in use to hold the end of the cable. By the term "hold" we intend to mean that the bracket grips the cable end in order to maintain the cable end in a fixed position (radially and/or axially) relative to the bracket. This allows the bracket to movement more closely match the cable movement to avoid the bracket damaging the cable by reducing sudden movement of the cable relative to the bracket. On the other hand, providing support without gripping the cable allows the cable more freedom to move allowing the cable arrangement to have a greater ability to adapt to the position of the carriage.

The track may be straight along its full length. Typically however, at least a portion of the track may be a corner. This allows the path followed by the carriage when moving along the track to change direction.

The corner may be provided by a vertex between two straight sections of track arranged with an acute or obtuse angle therebetween. Typically, the corner may be a curve. The curve may be provided by a number of adjacent straight sections with adjacent sections having a vertex at their connection and having an obtuse therebetween. Alternatively, the curve may be smooth (such as continuous).

The curve may be at least a 45 degree (°) curve, or at least a 90° curve or at least a 180° curve. We have found that when using a revolute joint between the bracket and carriage and a multicore cable with a 15 mm diameter and a smooth curve passing through 180°, the radius of the curve is able to be reduced by about three times over using a carriage that fixes the orientation of the cable end relative to the carriage. This allowed a reduction in curve radius from around 1200 mm to 1500 mm to around 400 mm to 500 mm while still allowing the carriage to be moveable along the track. Indeed, with a fixed bracket system we found the carriage stalled and was not able to move along the track when using setup described (i.e. a multicore cable with a 15 mm diameter and track with a 180° curve with a radius of around 400 mm to 500 mm). Having investigated the details we have accordingly found that, by using the linear motion system according to the fifth aspect, the radius of a curve in the track of the system is able to be reduced by approximately three times over when the bracket and carriage are not a kinematic pair.

The bracket can be rotatable about any axis relative to the carriage and track, and may have any orientation relative to the carriage and track. Typically the bracket may be orientated such that a longitudinal axis of the cable end at the bracket is at least partially aligned with the plane parallel to the longitudinal axis of the track. Additionally or alternatively the bracket may be rotatable about an axis oriented parallel to the normal to a plane parallel to the longitudinal axis of the track. This allows the increase in footprint of the carriage caused by the bracket to be kept to a minimum.

By the phrase "at least partially aligned" we intend to mean that the component of the longitudinal axis parallel to the plane is greater than or equal to (i.e. at least as large as) the component of the longitudinal axis normal to the plane.

The linear motion system of the fifth aspect may be used with the sample analyser of the first aspect, the sterilisation assembly of the second aspect, the method of the third aspect and the method of the fourth aspect. For example, the sterilisation assembly according to the first aspect may further comprise the linear motion system according to the fifth aspect, the linear motion system being arranged in use to pass the assay sample set through the enclosure; and/or the sample analyser according to the second aspect may further comprise a linear motion system having one or more features described herein, the linear motion system being arranged in use to move a sample set through the second zone; and/or in the method according to the third aspect the sample may be passed through the passage in the barrier of the analyser using the linear motion system according to the fifth aspect; and/or in the method according to the fourth aspect the sample may be transferred through the second zone using the linear motion system according to the fifth aspect. In each of these examples, the carriage of the linear motion system may provide the moveable stage, the track may provide the rail, the joint may provide the swivel joint and/or the cable may provide the (electrical) cable.

While the linear motion system is described herein relative to an example sample analyser and example sterilisation assembly, the linear motion system according to the fifth aspect is able to be used in any arrangement in which a linear motion system is used or usable.

BRIEF DESCRIPTION OF FIGURES

An example sample analyser and an example sterilisation assembly along with a corresponding example process able to be carried out using the example analyser and assembly and an example linear motion system are described in detail herein with reference to the accompanying figures, of which.

DETAILS DESCRIPTION

Figure 1:
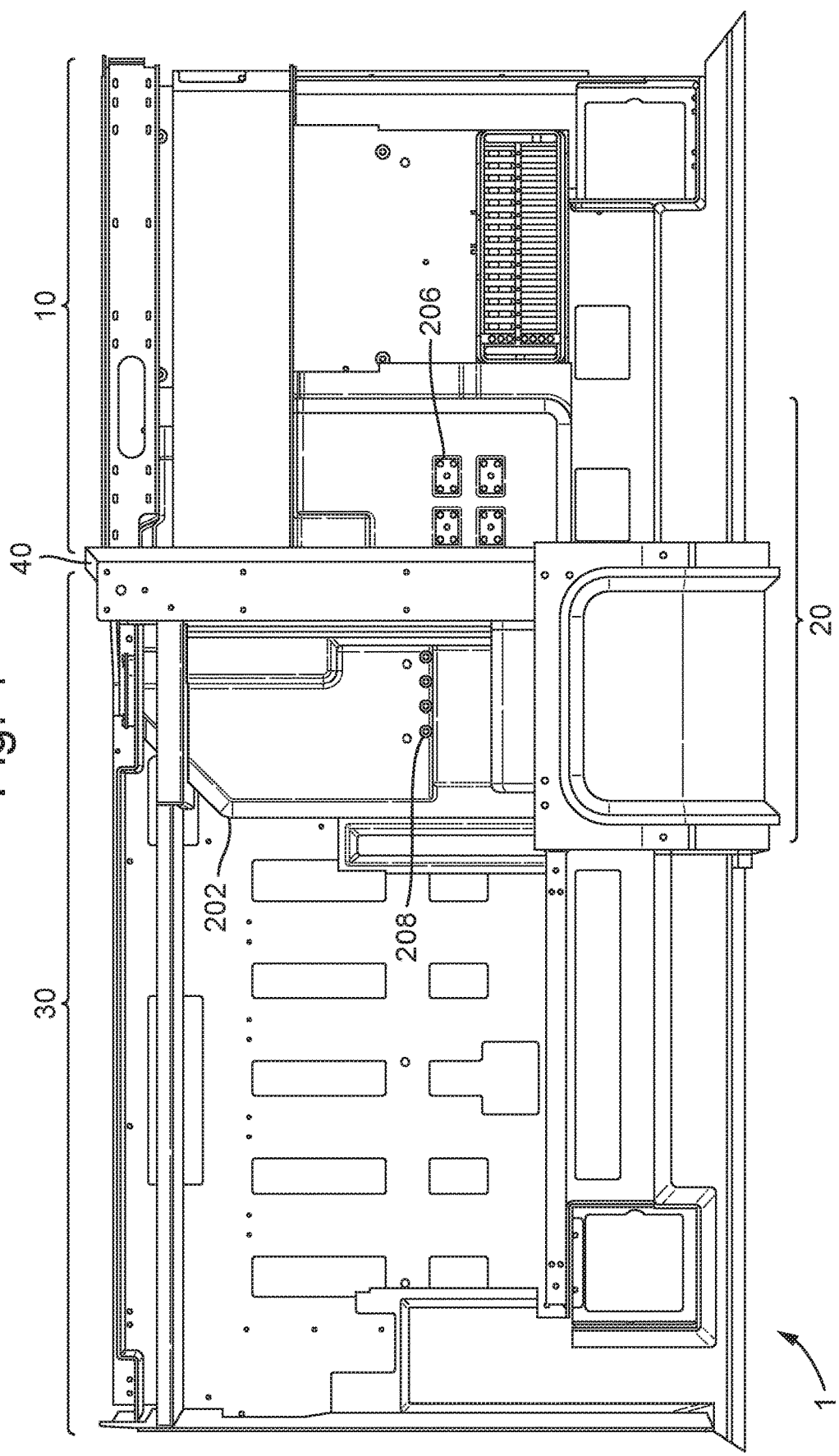
FIG. 1 shows a sectional view of an example sample analyser.

An example analyser is generally illustrated at 1 in FIG. 1. In this example, the analyser is suitable for conducting a molecular diagnostic assay on samples. To achieve this, the analyser has three separate zones, a first zone 10, a second zone 20 and a third zone 30, where various steps of the assay are carried out.

In order to conduct an assay on samples, a sample set (not shown) is provided for processing. For a molecular diagnostics assay, there are three general steps used to process each sample set. These are (1) extraction and purification, (2) amplification and (3) detection.

In the example analyser 1 shown in FIG. 1, the first zone 10 is shown on the right side. This means the first zone occupies one end of the analyser.

In use, the first zone 10 is the location in which the extraction and purification step of the assay is carried out. In this example, this includes a lysis process being conducted in order to extract the nucleic acids from the sample. Since the sample is typically provided in a liquid (i.e. in a liquid form, or as an additive to a liquid), this step is carried out in a sample holder (not shown). In other examples, the lysis process may be replaced with a suitable alternative.

In addition to a sample set, to carry out a lysis process, a lysis agent is needed. In this example, as set out below, this is provided by a user at the same time as the sample set is provided to the first zone 10 by a user.

In the example shown in FIG. 1, liquids used to carry out the extraction and purification step are moved within the first zone 10 by a robotic arm (not shown). The robotic arm provides a programmable translation system. This transports the liquids using pipette tips (not shown) connected to air displacement pipetters (not shown). The pipette tips are disposable. As such, when the use of a pipette tip is complete, it is placed in a waste receptacle.

Due to the number of liquids being used in the extraction and purification step, there is a high potential of contamination being produced. This may be in the form of organic material from a sample or from the chemicals and reagents used in the extraction and purification step. It is important that passage of this contamination to the other zones is minimised. To achieve this two forms of protection against contamination are provided. The first is physical barriers that block fluid communication passing across the barrier (i.e. from one side of the barrier to the other). The second is a sterilisation assembly 22.

Part of the physical barrier is provided by an enclosure 202. This also forms an exterior for the second zone 20. The enclosure separates the first zone 10 from the interior of the second zone.

The enclosure 202 is located approximately in the middle of the analyser 1. The enclosure is a generally cuboidal body with a spur extending from the body. The body has a generally square footprint, as does the spur. The spur has a volume of about a quarter of the volume of the body, and therefore is about a quarter of the size of the main body. The spur extends from one side of the body along about half the length of the side from which it extends. This causes the enclosure to have a generally L shaped footprint.

The enclosure 202 extends between the front and the back of the analyser 1. The height of the enclosure from its base to an upper surface is about a quarter to a third of the height of the interior of the analyser.

Due to the extension of the enclosure 202 between the front and back of the analyser 1, this provides a physical barrier between the first zone 10 and the third zone 30, which is located at an opposite end of the analyser to the first zone. To provide a complete barrier between the first zone and the third zone, an upright wall 40 extends upwardly from the enclosure 202 of the second zone 20 from a mid-point of the enclosure between an upper surface of the enclosure and a ceiling (not shown) of the interior of the analyser. This wall also extends between the front and back of the analyser. This means that, in combination, the enclosure and the wall block the path of fluid communication between the first zone and the third zone. This is except for communication provided through the second zone, on which more detail is provided below.

Above it is noted that there are two forms of protection against contamination. The second form of protection, in this example, is a sterilisation assembly 22 provided in the second zone 20.

In addition to the sterilisation assembly 22, on which more detail is provided below, being provided in the second zone 20, the second zone is also where the amplification step of the assay is carried out in this example. In this example, the amplification step is provided by a PCR process being conducted on a sample set. In other examples the amplification may be carried out by a different process.

The final stage of the assay, the detection process is carried out in the third zone 30. This involves the measurement of biomarkers using reagents and biochips, and, in this example, this also optionally involves detection of chemiluminescence.

The reagents and biochips are loaded into the third zone 30 by a user. In this example, in use the reagents are transferred within the third zone in liquid form in pipette tips (not shown). As with the pipette tips used in the first zone 10, the pipette tips are transported within the third zone by a programmable translation system in the form of a robotic arm (not shown). The robotic arm transports the pipette tips by connection of each pipette tip to an air displacement pipetter (not shown). As mentioned above, the pipette tips are disposable, meaning when the use of a pipette tip is complete it is placed in a waste receptacle.

The extraction and purification process being carried out in the first zone 10, the PCR process being carried out in the second zone 20 and the detection process being carried out in the third zone 30 means sample sets need to be transferred from the first zone to the second zone and from the second zone to the third zone in use. There is therefore a path from the first zone to the third zone through the barrier provided by the enclosure 202 and the wall 40. This means that contamination could pass between the first zone and the third zone through the second zone by fluid communication, such as by airborne passage of contaminants. However, the sterilisation assembly 22 minimises contamination passing between the first zone and the third zone by fluid communication. There are also a number of features that assist in minimising contamination.

One such feature is how a sample set is transferred between the first zone 10 and the second zone 20 and the second zone and the third zone 30. In order to avoid contamination on a sample holder being transferred between zones by transferring a sample holder through the analyser 1 from one zone to the next, instead the second zone is able to hold a plurality of cartridges 204 (see FIG. 3). In this example, the second zone is able to hold up to four cartridges. In other examples, a different number of cartridges may be able to be held in the second zone.

Each cartridge 204 has a plurality of wells (in this example, each cartridge has four wells, but could have a different number). Each well is arranged to hold liquid and is sealable. In this example, since PCR is used, each well is pre-loaded with chemicals that allow the PCR process to proceed. Each well is also able to have further liquid added to it to allow sample fluid to be added to each well.

Transfer of contamination is further limited by the arrangements for transferring a sample set between the first zone 10 and the second zone 20, and the second zone and the third zone 30. For a sample set to be transferred from the first zone to the second zone, the purified sample is placed into the wells of the cartridges 204 in the second zone.

Placement of the purified sample into the cartridge wells is permitted by first openings 206 in an upper surface of the enclosure 202 on a side of the wall 40 proximal to the first zone 10. The first openings are an array of through-bores in the enclosure between an exterior of the enclosure and the interior of the enclosure. Additionally, in this example, there are the same number of first openings as the number of cartridges.

The first openings 206 are each sized to have an area of approximately the same size as an upper surface of the cartridges. This permits pipette tips to be lowered through the first openings and for sample from each pipette tip to be transferred into a respective well in the cartridges 204. Due to each of the first openings being about the same size as the upper surface of each cartridge, this limits air flow (or gas flow) between the first zone 10 and the second zone 20 thereby limiting the amount of airborne contamination that is able to pass between the first and second zones.

A similar arrangement is used for transferring sample from the second zone 20 to the third zone 30. To transfer sample from the second zone to the third zone amplified sample is extracted from the wells by aspiration into a pipette tip. This is permitted by second openings 208 in the enclosure 202. The second openings are located in an upper surface of the enclosure on a side of the wall 40 proximal to the third zone.

Similar to the first openings 206, the second openings 208 are an array of through-bores in the enclosure 202 between an exterior of the enclosure and the interior of the enclosure.

In this example, there are four second openings 208. Each second opening is sized to have a diameter of up to twice the diameter of the end of the pipette tips used to aspirate sample from the wells. This may be approximately a quarter of the size of the upper surface of the cartridges 204. As with the first openings 206, this limits air flow through the second openings thereby limiting the amount of airborne contamination that is able to pass between the second and third zones.

Figure 2:
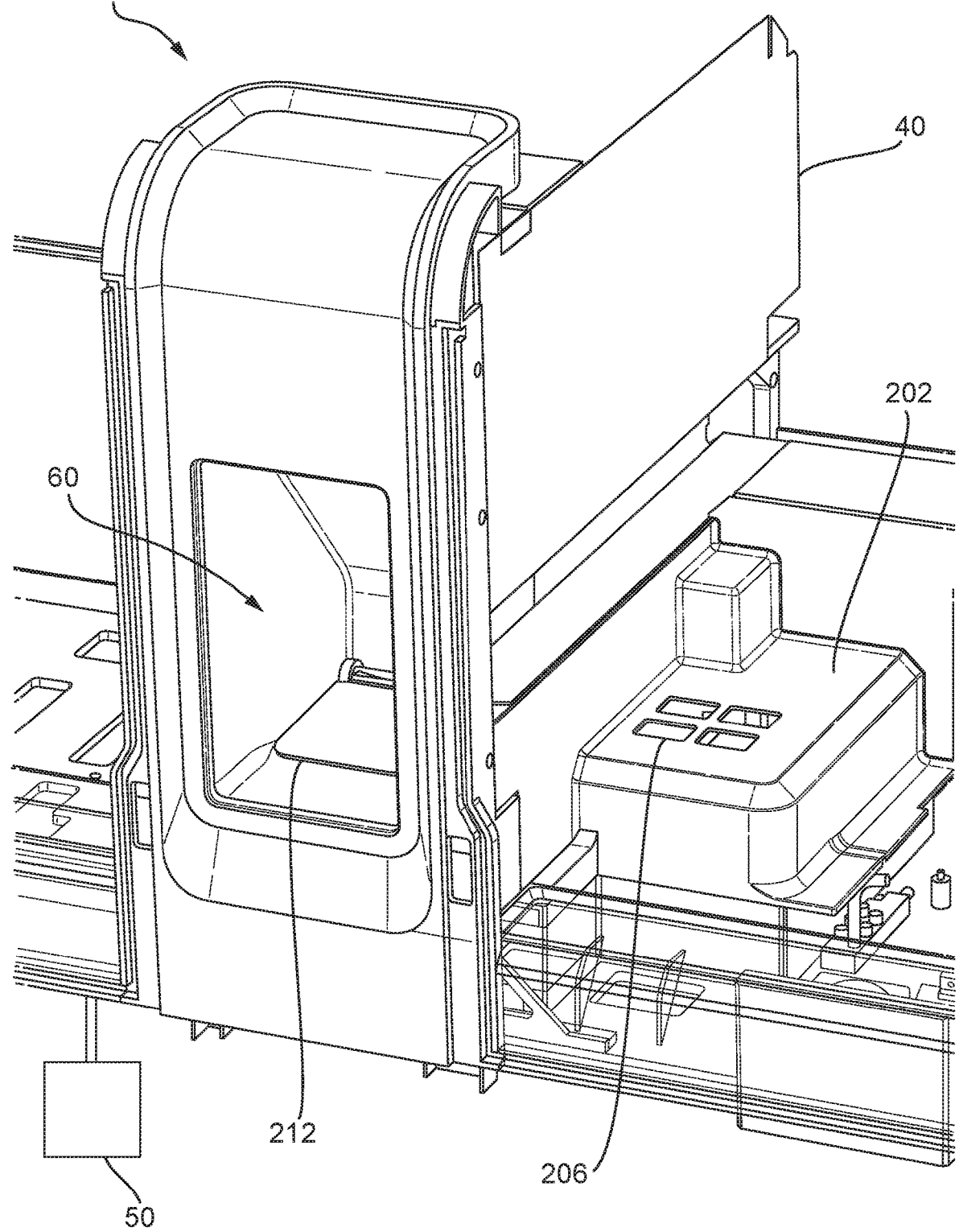
FIG. 2 shows a further sectional view of the example sample analyser.

FIG. 2 shows the enclosure 202 of the second zone 20 with the first openings 206 in an upper surface of the enclosure. This figure also shows the wall 40 providing part of the barrier between the first zone 10 and the third zone 30.

As set out above a sample set is transferred between the first zone 10 and the third zone 30 through the second zone 20 by loading a sample set into cartridges 204 from the first zone and unloading the sample set from the cartridges to the third zone. The cartridges are loaded into the second zone at a cartridge loading opening 210 (shown in FIG. 6), which in FIG. 2 is shown in a sealed arrangement, sealed with a door 212 covering the cartridge loading opening 210.

Other than a user providing the sample sets to be analysed, the materials for the detection process and the extraction and purification process as well as the cartridges, the analyser 1 of this example is arranged to carry out the assay without user interaction. In order to achieve this, the analyser has a controller 50 (shown in FIG. 2).

In this example, the controller 50 (shown in FIG. 2) is arranged in use to operate the analyser in line with input provided by the user (such as by a graphical user interface, not shown). This includes control of the various programmable translation systems, such as robotic arms and other components used for moving elements around the analyser and the various systems contained within the analyser for processing sample sets during the assay. Of course, the controller is also able to carry out the processing of the data produced by the assay process to allow the components of sample sets to be identified. Accordingly, the controller provides automation of the assay process.

Due to the barrier provided in part by the enclosure 202 of the second zone 20 and the sterilisation assembly 22, the second zone is a core element of the analyser 1 that minimises passage of contamination through the analyser 1. This allows several sample sets to be processed at the same time by the analyser, since the risk of cross contamination between sample sets that are held in different zones from each other is kept to an acceptable level. Additionally, this is simplified and improved by the automation provided by the controller 50 due to the further reduction in user interaction it allows.

Figure 3:
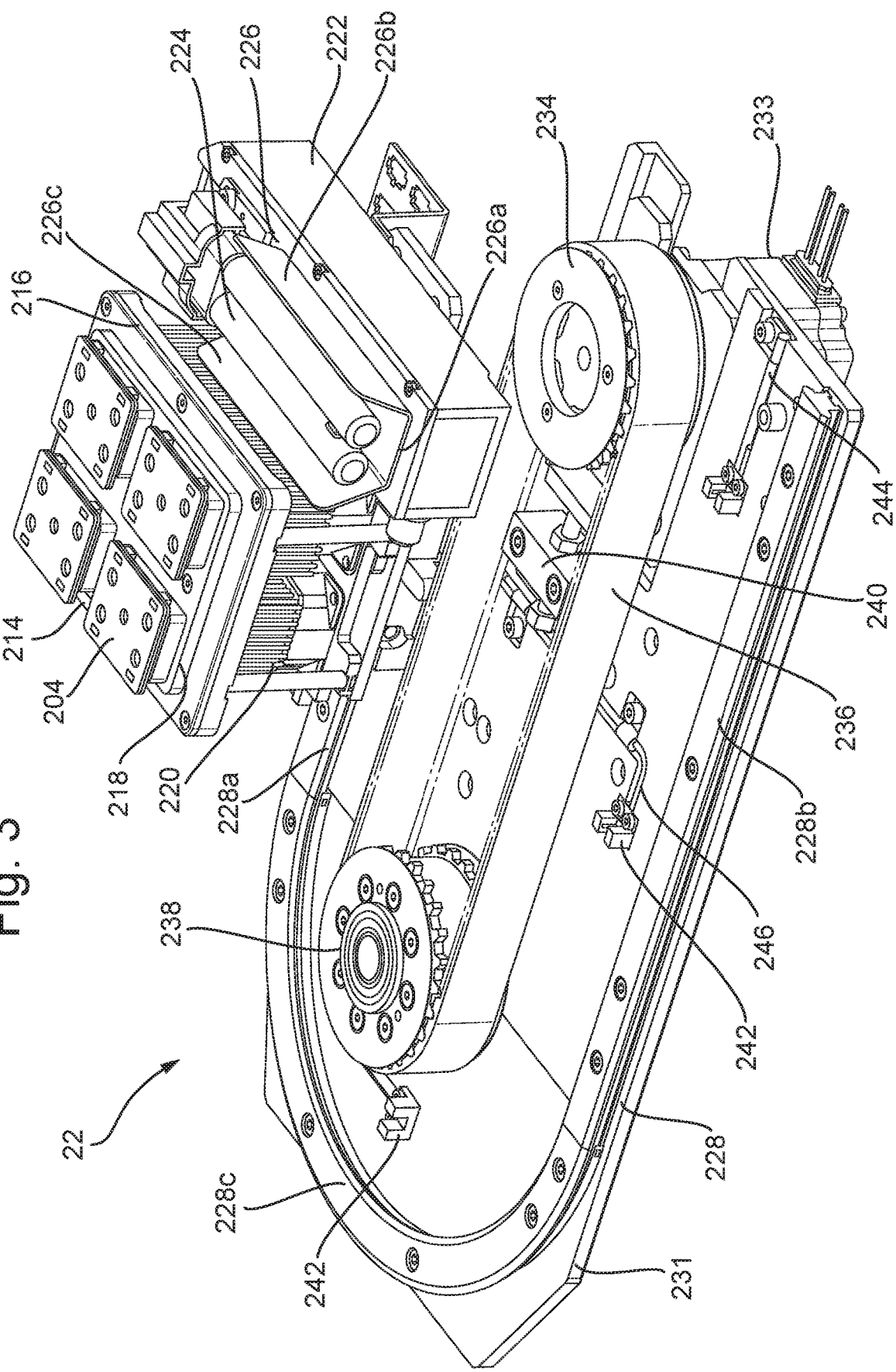
FIG. 3 shows a sectional view of an example sterilisation assembly.

The sterilisation assembly 22 is shown in FIG. 3. In this example, the sterilisation assembly comprises a stage 214.

The stage 214 has an upper surface 216. This upper surface has a generally rectangular shape and is orientated to be generally level. The upper surface of the stage is used to support the cartridges 204. To assist with this, in this example, the upper surface of the stage has a plurality of cartridge holders 218. Although the shape of the cartridge holders is not shown in the figures, the cartridge holders have a complementary shape to the cartridges. In this example, there are four cartridge holders. Of course, in other examples, a different number of cartridge holders may be provided.

FIG. 3 shows the cartridge holders 218 arrange in an array. In this example, the four cartridge holders are arranged in a two by two array forming a shape that approximately matches the shape of the upper surface 216 of the stage 214, but has a smaller overall area. This arrangement therefore provides a lip around the edge of the upper surface of the stage. In other example, this lip may not be present.

The stage 214 also has a Peltier system 220 located on an underside of the upper surface 216 of the stage. This is positioned on an opposing side of the upper surface to the cartridge holders 218.

The Peltier system 220 is thermally coupled to the cartridge holders 218. In use, the Peltier system is able to produce Peltier cooling and Peltier heating. Due to the thermal coupling between the Peltier system and cartridge holders, the cartridge holders are able to be heated and cooled by the Peltier system in use. This allows heating and cooling of cartridges 204 and any sample held in the cartridges when cartridges are held in the cartridge holders. This assists with conducting the PCR process carried out when cartridges 204 are positioned on the stage and contain sample.

As noted above, the upper surface 216 of the stage 214 is generally rectangular in shape. The Peltier system 220 is contained within the footprint provided by the generally rectangular shape of the upper surface of the stage.

A decontaminator 222 is positioned adjacent a long side of the upper surface 216 of the stage 214. The decontaminator comprises a bulb 224 and a reflector 226. In this example, the decontaminator is a component of the stage. In other examples, the decontaminator may be a separate component that does not form part of the stage.

The bulb 224 of the decontaminator 222 provides electromagnetic radiation in use that is capable of sterilising contamination. In this example, the electromagnetic radiation is Type C ultraviolet radiation (in other words ultraviolet light), also referred to as UVC radiation or UVC light. In other examples, other forms of electromagnetic radiation may be used instead of UVC light.

The bulb 224 in this example emits UVC light in use from two parallel elongate tubes located adjacent each other. The tubes are orientated so they are generally level and parallel with the long side of the stage 214 to which the decontaminator 222 is adjacent.

The reflector 226 of the decontaminator 222 is arranged to distribute radiation emitted by the bulb 224 when in use upwardly from the decontaminator. This is achieved by the reflector having a flat rectangular base 226a that is positioned underneath the tubes of the bulb along the entire length of the tubes. There are also upstanding sides 226b, 226c connected to each of the long sides of the base. The upstanding sides are inclined outward from the base. This allows the light to be reflected upwardly and outwardly from the bulb. This directs the light in a substantially V shaped distribution over an angle of at least 45 degrees (°) and at most 180° in a direction parallel to the short sides of the base. For example, the UVC may be distributed over an angle of 90° from the centre point of the bulb creating a distribution over a total angle of 90°, or may be distributed over a total angle of 180°. UVC light is also directed from the bulb in other directions in a similar distribution pattern.

Figure 9:
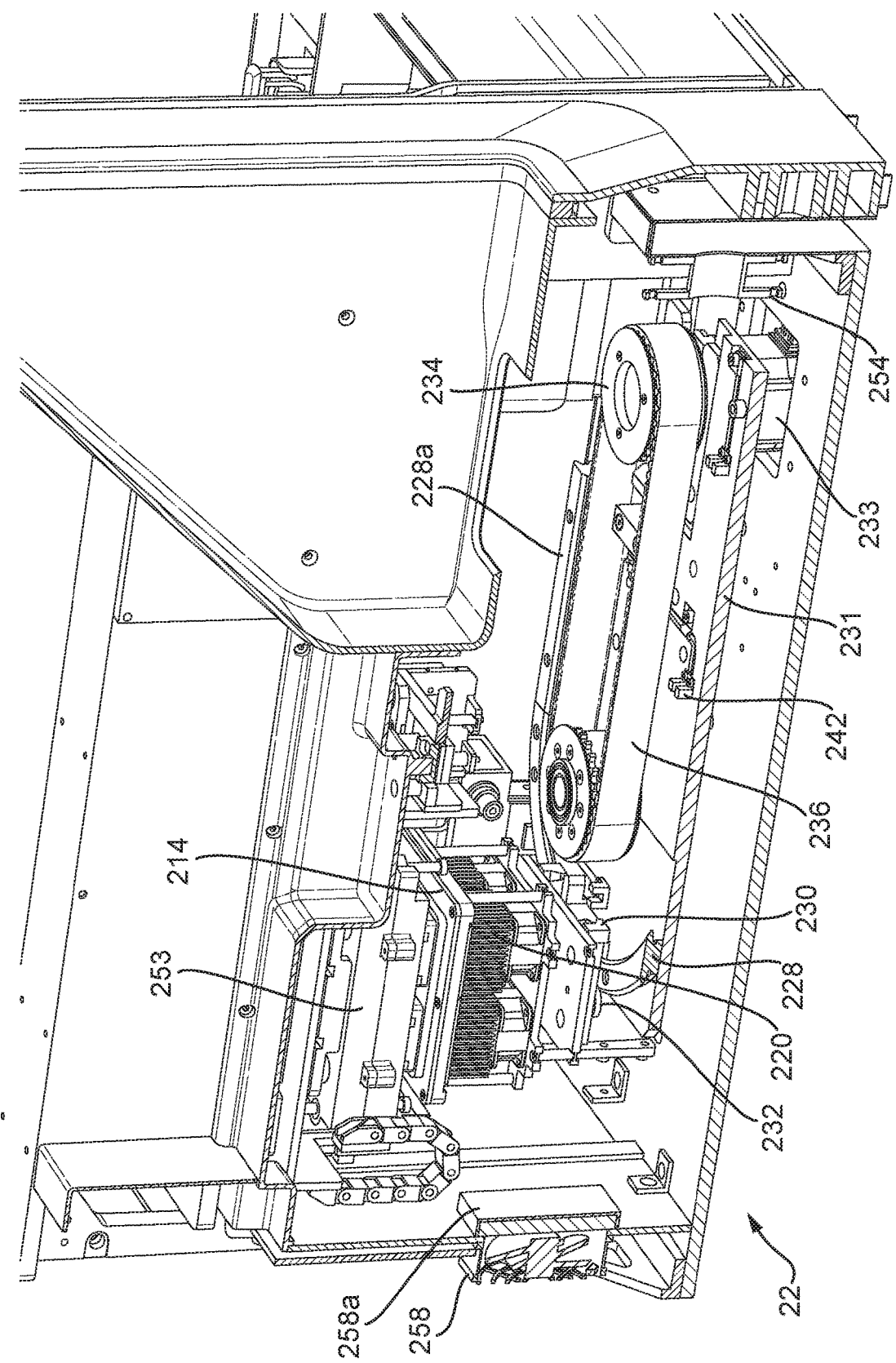
FIG. 9 shows a another sectional view of the example sterilisation assembly

The stage 214 is mounted on a rail 228. This mounting is provided by a foot 230 (shown in FIGS. 9 and 11) of the stage coupling the stage to the rail. The foot has rollers 232 that engage with a side of the rail. These rollers fit underneath an upper portion of the rail, the overall shape of which is generally T shaped. The combination of the shape of the rail and the rollers holds the stage to the rail while allowing the stage to be moveable along the rail. In some examples, the foot may have a roller that abuts an upper surface of the rail to ease movement of the stage along the rail.

The mounting of the stage 214 on the rail 228 causes the upper surface 216 to be positioned over the rail. In this example, the upper surface is orientated with its long sides across the rail, the rail crossing under the upper surface at approximately a mid-point of the upper surface. As can be seen from FIG. 3, this orientation positions the long sides of the upper surface of the stage approximately perpendicular to the length of the rail. In other examples, the relative positioning of the rail and stage upper surface may be such that the short sides of the upper surface are across the rail, or in another arrangement.

The rail 228 is about 600 mm to 700 mm in length. Instead of being straight however, in this example, the rail has two straight portions, a first straight portion 228a and a second straight portion 228b that are connected by a curved section 228c. In other examples, the rail may comprise a single portion and/or may be straight or have multiple curves.

As shown in FIG. 3, in this example, the curved section 228c of the rail 228 is a semicircle. One end of each of the straight portions 228a, 228b each abut a respective end of the curved section of the rail. This provides a single length of rail, which, in this example, comprises three separate rail sections, each formed of one of the portions of the rail. In terms of lengths of each section, the first straight portion of the rail has a length of between about half and two thirds of the length of the second straight portion. The second straight portion in turn has a length of between about two thirds and three quarters the length of the curved portion (the length of the curved portion in this case being the length of the rail providing the semi-circle).

Each of the sections of the rail 228 are, in this example, fastened to a platform 231. In this example, the rail sections are fastened to the platform by screws. In other examples, the rail may be attached to the platform by another means, or may be formed as a single piece with the platform.

The platform 231 is formed of two parts which abut each other along a side of each part, one of which the curved portion 228c of the rail 228 is attached to, and the other of which the straight portions 228a, 228b are attached to.

In addition to the rail 228, a drive mechanism is also connected to the platform 231. The drive mechanism comprises a motor 233 attached to a drive wheel 234. The drive wheel is engaged with a belt 236 that is held between the drive wheel and an idler wheel 238.

Each of the drive wheel 234 and the idler wheel 238 has teeth that provide grip between the belt 236 and the respective wheel. The grip is only maintained if the belt is held taut. To achieve this, a tensioner 240 is connected between the platform 231 and the motor 233. The tensioner is able move the motor relative to the platform towards or away from the idler wheel 238. In this example, this is achieved using a lead screw mechanism to adjust the tension of the belt in use to an appropriate tension amount. In other examples, other suitable tension mechanisms may be used.

The stage 214 is coupled to the belt 236. As such, when the belt is moved by use of the motor 233 to turn the drive wheel 234, the stage is moved along the rail 228. The belt and the rail are complementary shapes. This avoids causing unwanted tension on the belt and/or causing additional wear on the rail and foot 230 of the stage.

In order to keep the drive mechanism simple while maintaining the complementary arrangement of the belt 236 and rail 228, the idler wheel 238 is not connected directly to a motor. Instead, the idler wheel is moved in use due to the movement of the belt caused by the motor 233 turning the drive wheel 234.

As is set out in more detail below, the stage 214 is moved between various different positions along the rail when in use where the stage is kept in place for a period of time. In order to identify when the stage has reached a location at which it should stop, in this example, light gates 242, such as a slot-optical sensor, are used.

The light gates 242 are each located in a position on the same surface of the platform 231 to which the sections of the rail 228 are fastened. These are placed at appropriate locations on the platform to allow the stage 214 to be stopped at a suitable position.

To stop the stage 214 at a suitable position, a breaker (not shown) on the stage passes into the light gate 242 located for that position. This causes a signal to be sent (via the controller 50) to the motor 233 to stop turning the drive wheel 234. The motor is then started again in response to a predetermined trigger. Based on which light gate the breaker has passed into, this may be a particular event occurring or a predetermined time having elapsed from when the stage was stopped.

To avoid the stage 214 catching on a wiring connecting each of the light gates 242 to the controller 50, wiring 244 attached to the light gates is positioned in channels 246 in the platform 231.

In view of the Peltier system 220 and the decontaminator 222, along with any other electronics on the stage 214, a cable (not shown) is also connected to the stage. The cable is also attached to the controller 50, and in use the cable provides power to the electrical components on the stage and provides those components with control signals that determine when each component is to operate.

The platform 231 is elevated on pillars (not shown) above a base of the enclosure 202. This allows the cable connected to the stage 214 to pass underneath the platform (i.e. on an opposing side of the platform to the rail 228). This allows the cable to avoid becoming caught on components on the side of the platform on which the rail is mounted.

Since the stage 214 moves, the cable connected to the stage needs to be long enough to avoid the cable becoming taut at any point on the path along which the stage is moved in use. However, while providing this length avoids this issue, there is then a significant length of cable which could suffer from wear and fatigue by being straightened and folded as the stage moves along the rail 228. To address this, the cable has a swivel joint (not shown) that allows the cable to bend without deforming or kinking.

The sterilisation assembly 22 shown in FIG. 3 is located within a tunnel. This tunnel is provided by the enclosure 202 of the second zone 20. In addition to the walls 248 shown, for example, in FIG. 5 around the outer perimeter of the second zone, the tunnel has further walls (not shown) that divide interior of the enclosure into a passage that follows the shape of the rail 228.

These further walls extend downwardly from an interior upper surface of the enclosure 202 towards the platform 231. These further walls are approximately aligned with the belt 236. This means that instead of extending downwardly to the platform, the further walls extend downwardly from the interior upper surface of the enclosure to an upper side of the belt (without contacting the belt). The belt then provides a further barrier, which has the effect of extending the wall down to the platform. The walls of the enclosure, the further walls and the barrier provided by the belt thereby form a tunnel that is generally shaped in an U shape, and which follows the path along with the rail 228 runs.

Figure 4:
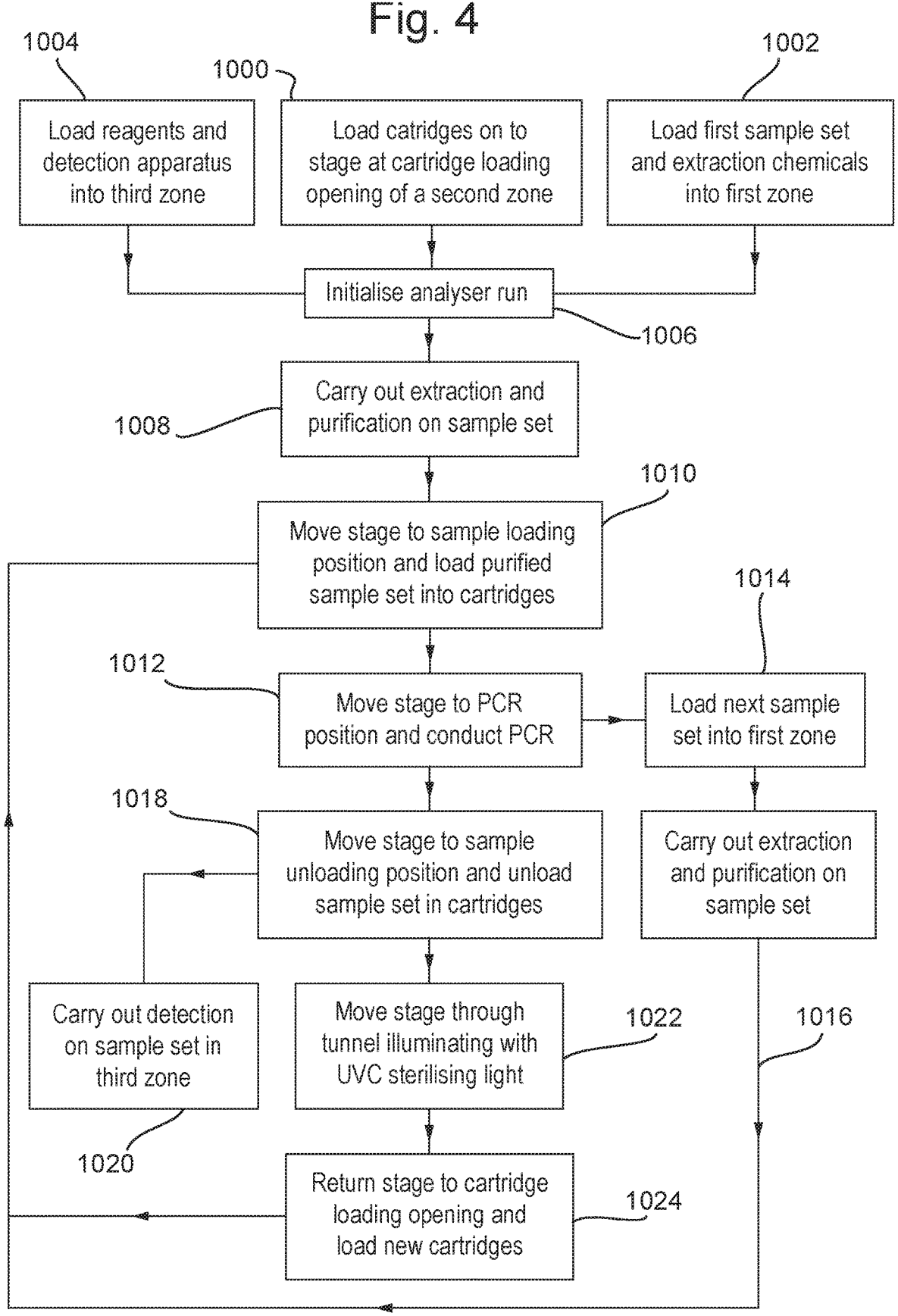
FIG. 4 shows a flow diagram of an example process using the example analyser and example assembly.

FIG. 4 shows the process that is applied in order to allow the sterilisation assembly 22 and the analyser 1 as a whole to be used to conduct an assay on samples. This includes the ability to conduct an assay on multiple sample sets at the same time due to contamination being able to be sterilised by the sterilisation assembly and the ability of each well in each cartridge to be sealed. FIGS. 5 to 11 show the analyser and sterilisation assembly at various points in the assay process as set out in FIG. 4.

Before the assay is started, in step 1000, cartridges 204 are loaded on to the stage 214 in the second zone 20. In step 1002 a sample set along with extraction and purification chemicals are loaded into the first zone 10; and in step 1004 reagents and detection apparatus are loaded into the third zone 30.

To load the cartridges 204 on to the stage 214, a user opens the door 212 covering the cartridge loading opening 210, which is located in an alcove 60 in the analyser 1. The door is shown in an open position in FIG. 6. The shape of the alcove (a flat base with a back inclined towards the open side of the alcove with upright sides) provides easy access to the upper surface 216 of the stage and the cartridge holders 218 for the user. As set out above, the cartridge wells each contain chemicals that allow PCR to be conducted and are sealed. In some examples the wells are sealed with a self-sealing membrane. In other examples, the wells are sealed with PCR oil.

Figure 5:
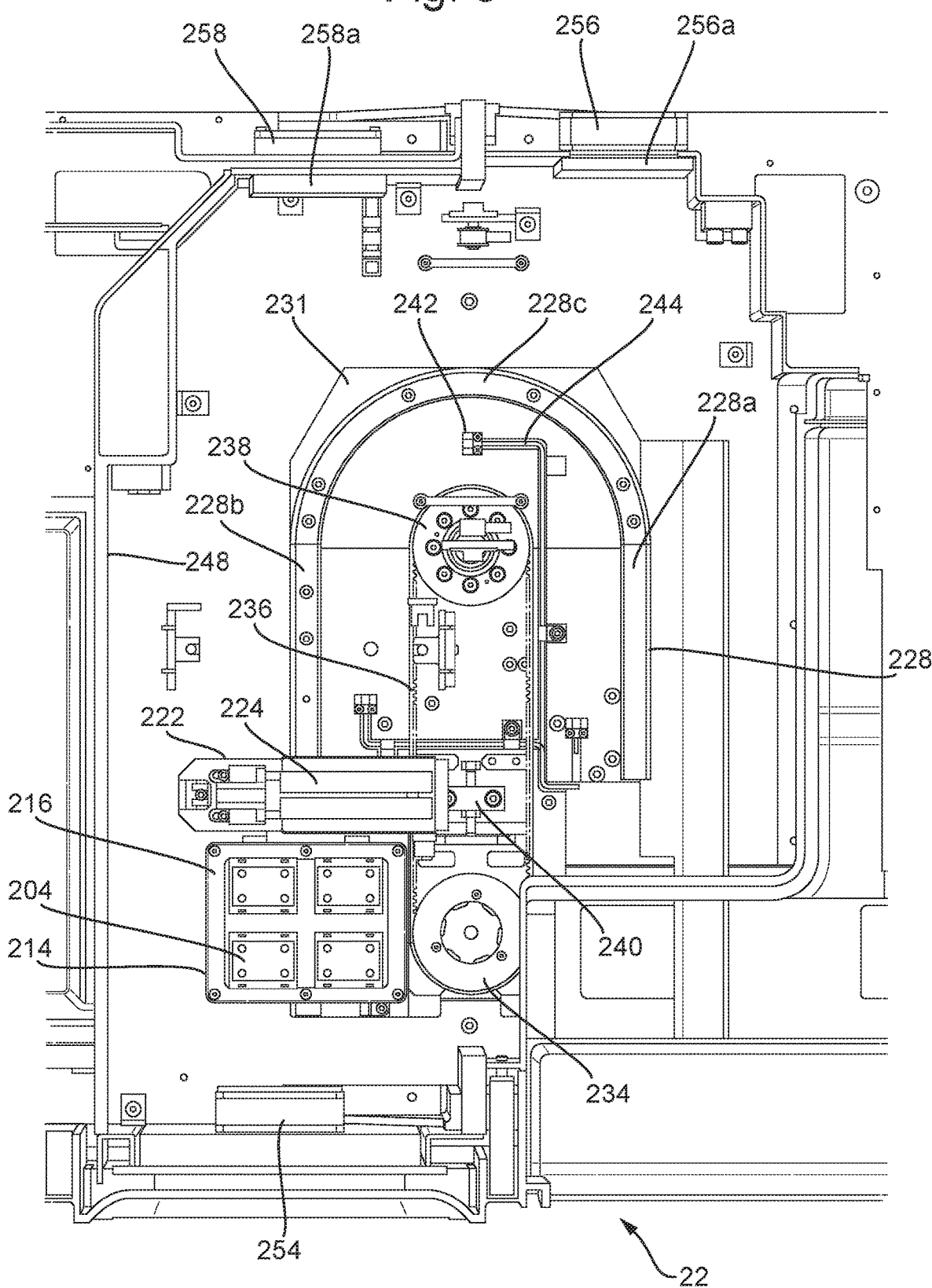
FIG. 5 shows a plan view of the example sterilisation assembly.

In FIG. 5 the stage 214 can be seen located at an end of the second rail section 228b distal to the curved section 228c of the rail 228. This is the position the stage is located before the assay starts and to which the stage is returned at the end of the processing carried out on a respective sample set.

FIG. 5 also shows (as do FIGS. 7, 8 and 10) that the platform 231 is orientated so the end of the second rail section 228b that extends further from the connection of the second rail section to the curved rail section 228c than the first rail section 228a extends from the connection of the first rail section to the curved rail section is located in the spur of the footprint of the enclosure 202. This places the platform approximately centrally in the second zone 20.

Figure 6:
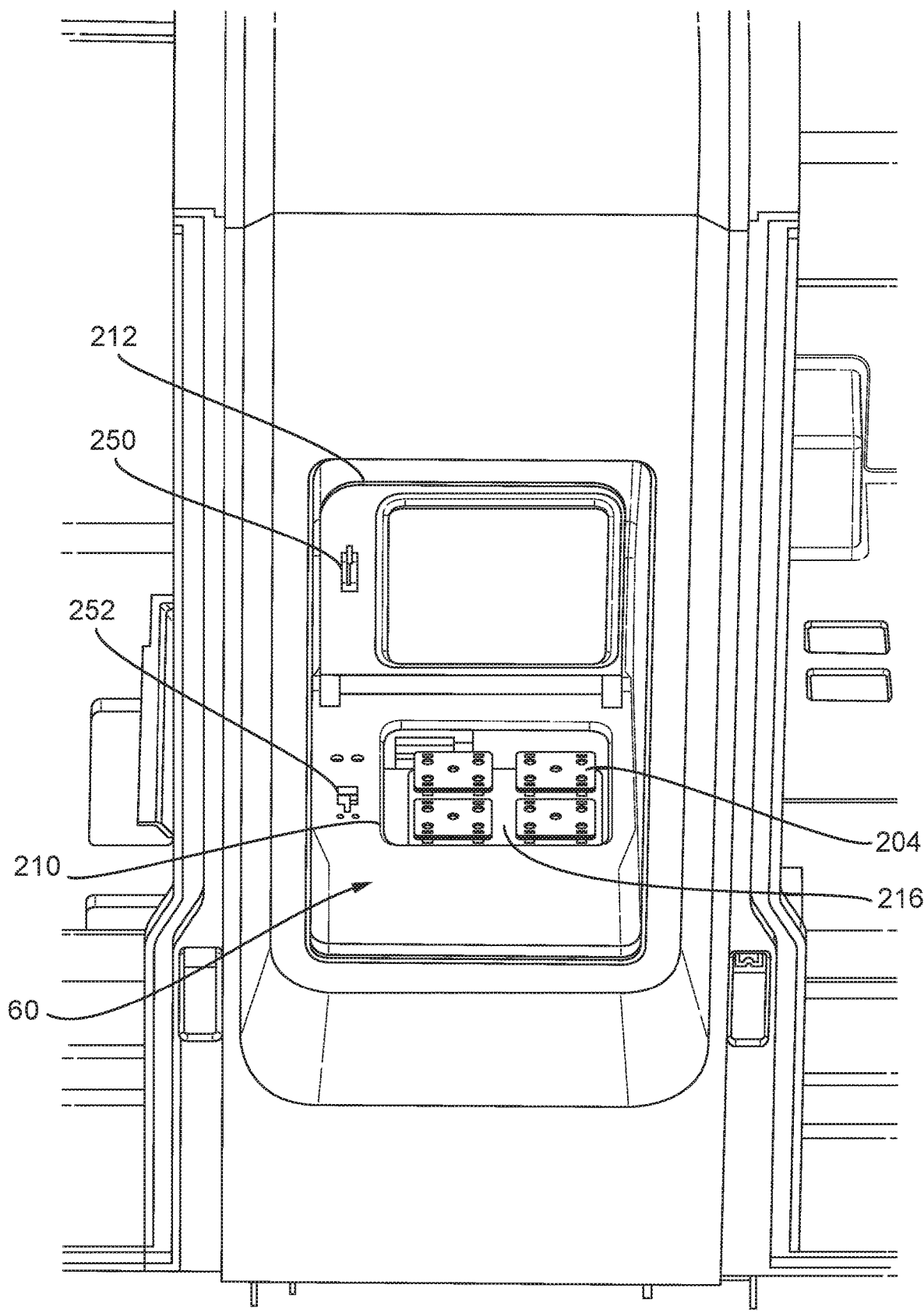
FIG. 6 shows a further sectional view of the example sterilisation assembly.

Once the cartridges 204 are loaded through the cartridge loading opening 210, the door 212 is closed. As shown in FIG. 6, the door has a latch projection 250 that extends into a recess 252 in the analyser 1 when the door is closed. This holds the door closed while the analyser is in use and samples are being processed in the second zone 20.

In order to load a sample set along with extraction and purification chemicals into the analyser 1, these are first loaded into analysis cartridges (not shown), which are placed in a caddy (not shown). The caddy is then loaded, by a user, into the first zone 10 through a door (not shown) that provides access to the first zone. Once the caddy is suitably loaded into the first zone, the door is closed.

A similar process is carried out to load reagent and detection apparatus into the third zone 30 of the analyser 1. These are loaded into analysis cartridges (not shown), which are again placed in a caddy (not shown). The caddy is loaded by a user into the third zone through a door in the analyser 1. When the caddy has been suitably loaded into the third zone, the door is closed.

In addition to loading each caddy into the respective zones, other equipment may be loaded into the zones such as pipette tips and reagent bottles. This is usually carried out at the start of a day or between assay runs.

Once each of these steps is completed, the analyser run is started to allow the assay to be conducted, step 1006. This is achieved by the user interacting with a user interface (not shown) to start the assay processing.

The extraction and purification process is then conducted on the sample set in the first zone 10, step 1008. As mentioned above, this is the first stage of the assay. In this example, this stage of the assay takes approximately an hour to complete.

Figure 7:
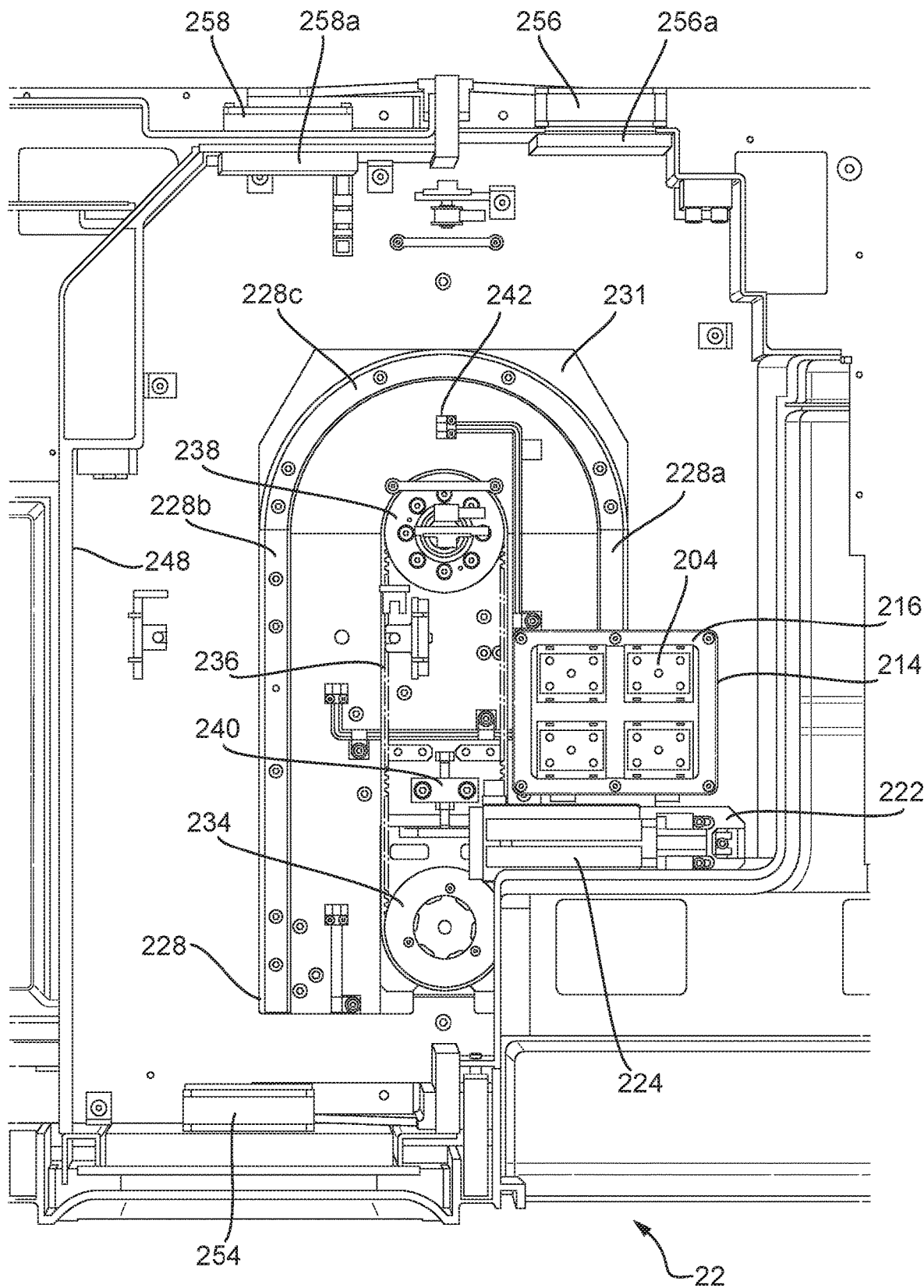
FIG. 7 shows a further plan view of the example sterilisation assembly.

Next the purified sample is transferred from the first zone 10 into the second zone 20, step 1010. This is achieved by moving the stage 214 to the opposing end of the rail 228 as shown in FIG. 7. This shows the stage located at the end of the first rail section 228*a* distal to the curved section 228*c* of the rail.

The stage 214 is transferred from the cartridge loading position to this sample loading position by the drive mechanism moving the stage along the rail 228. Once moved to the sample loading position, this allows the purified sample to be loaded into the cartridges 204. As set out above, loading of the sample into the cartridges is achieved by passing pipette tips through the first openings 206, lowering the tips into the cartridges wells and aspirating sample from the tips into the wells.

Figure 8:
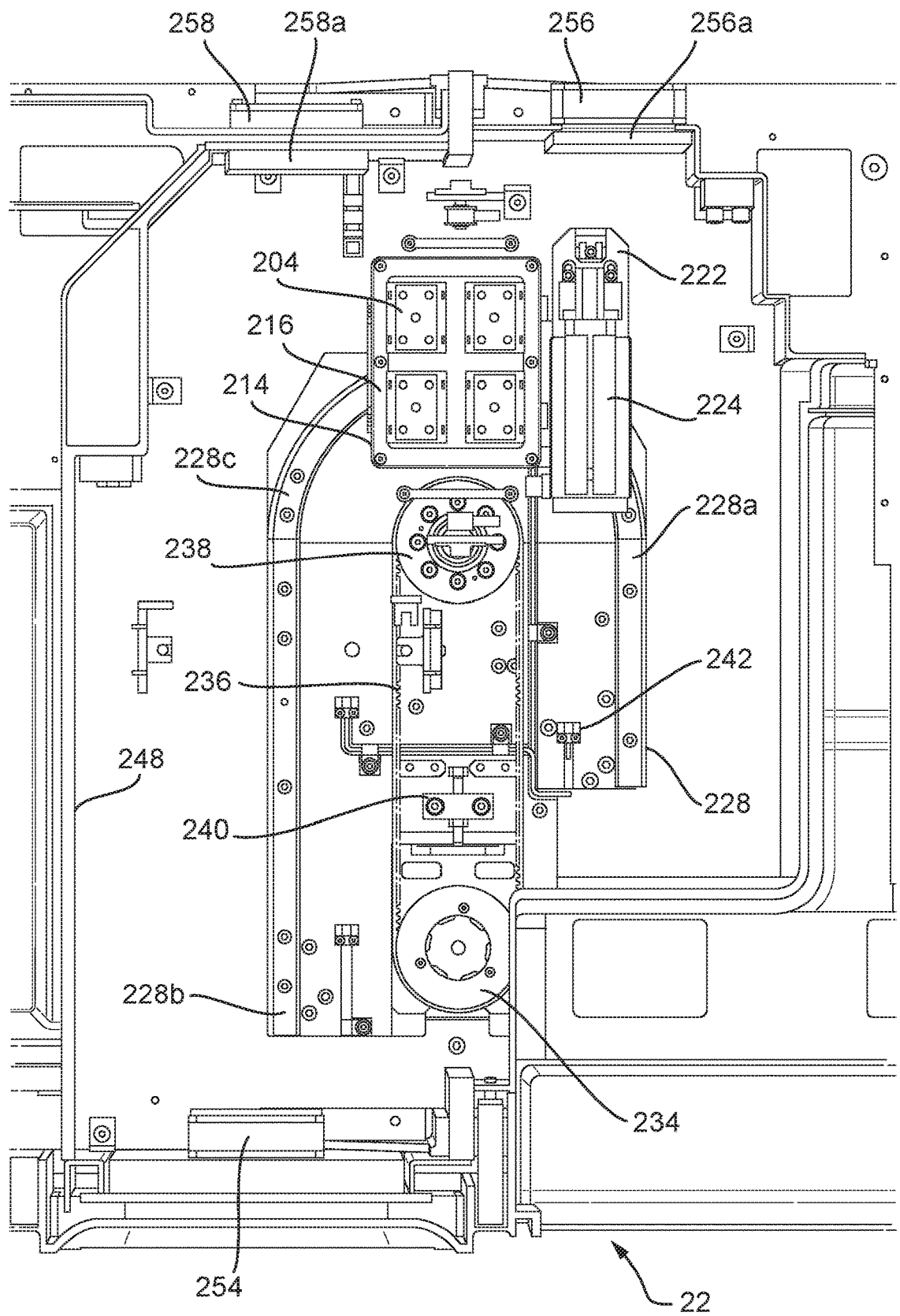
FIG. 8 shows a another plan view of the example sterilisation assembly.

The stage 214 is then moved to a position on the midpoint of the curve of the curved section 228*c* of the rail 228. This is shown in FIG. 8. In this position PCR is conducted, step 1012. In this example, this stage of the assay also takes approximately an hour to complete.

One of the steps of PCR is thermal cycling. This is achieved using the Peltier system 220 and includes lowering a container 253 (shown in FIG. 9 and FIG. 10) over the upper surface 216 of the stage 214 to create a closed environment around the cartridges 204. This makes heating and cooling more efficient and more precise due to the insulating effect the closed environment provides around the cartridges to prevent heat loss. In this example, a base of the container is lowered to abut the lip of the upper surface of the stage. The container is provided with a recessed section (not shown) within a perimeter that provides the base. In use, the cartridges fit within the recessed section when the container is in abutment with the lip of the upper surface of the stage.

During the PCR process, air is pumped through the enclosure 202 by fans, which therefore act as a pump. An intake fan 254 shown in FIG. 8 is located in a wall of enclosure 202 at an air inlet. This wall also forms an outer wall of the analyser 1 and is located under the alcove 60 where the cartridge loading opening 210 is located.

The positioning of the intake fan 254 approximately aligns the intake fan with the second rail section 228*b*. This means that if air from the fan were to travel in a straight line from the fan when drawn into the enclosure 202, the air would travel parallel to, and along, the length of the second rail section.

A first outlet fan 256 and a second outlet fan 258 are located at air outlets in an outer wall of the analyser 1 (also providing a wall of the enclosure 202) that is on an opposite side of the analyser from the wall in which the intake fan 254 is located. In the example shown in FIG. 8, these form the front wall of the analyser (where the intake fan is located) and a back wall of the analyser (where the first and second outlet fans are located).

The intake fan 254 has a filter (not shown) that removes dust and other particulate matter from the air that is drawn into the enclosure 202 from outside of the analyser 1. The first outlet fan 256 and the second outlet fan 258 also each have a filter 256*a*, 258*a*, which are each located over an internally facing side of the respective outlet fan. Each of these filters removes contaminants and other particular matter from the air that is extracted from the enclosure.

The first outlet fan 256 is positioned in approximate alignment with the first rail section 228*a*. This means that if air were to pass in a straight line towards the fan when extracted from the enclosure 202, the air would travel parallel to, and along, the length of the first rail section. The second outlet fan 258 is positioned relative to the second rail section 228*b* in a similar manner to how the intake fan 254 is positioned relative to the second rail section.

When PCR is being conducted, air is drawn into the enclosure 202 through the intake fan 254 and is extracted from the enclosure through the first outlet fan 256. Due to the walls of the enclosure forming the tunnel, this directs air from the front wall of the analyser 1, along the length of the second rail section 228*b*, round part of the curved section 228*c* of the rail 228 through, over, round and past the stage 214 and its components and out of the back wall of the analyser. This assists with regulating the temperature of the cartridges 204.

At this point in the assay, while the PCR is being conducted, if a further sample set has not already been loaded into the first zone 10, the user loads a further sample set into the first zone, step 1014. This is achieved as set out above in relation to step 1004.

Once a further sample set is loaded (or if a further sample set has already been loaded), extraction and purification is carried out on the further sample set, step 1016.

On completion of the PCR process, the stage 214 is moved to a sample unloading position where the cartridges are aligned with the second openings 208 and the sample amplified by the PCR process is unloaded from the cartridge wells to the third zone 30, step 1018. The stage is again moved from the previous position to the sample unloading position by the drive mechanism.

Figure 10:
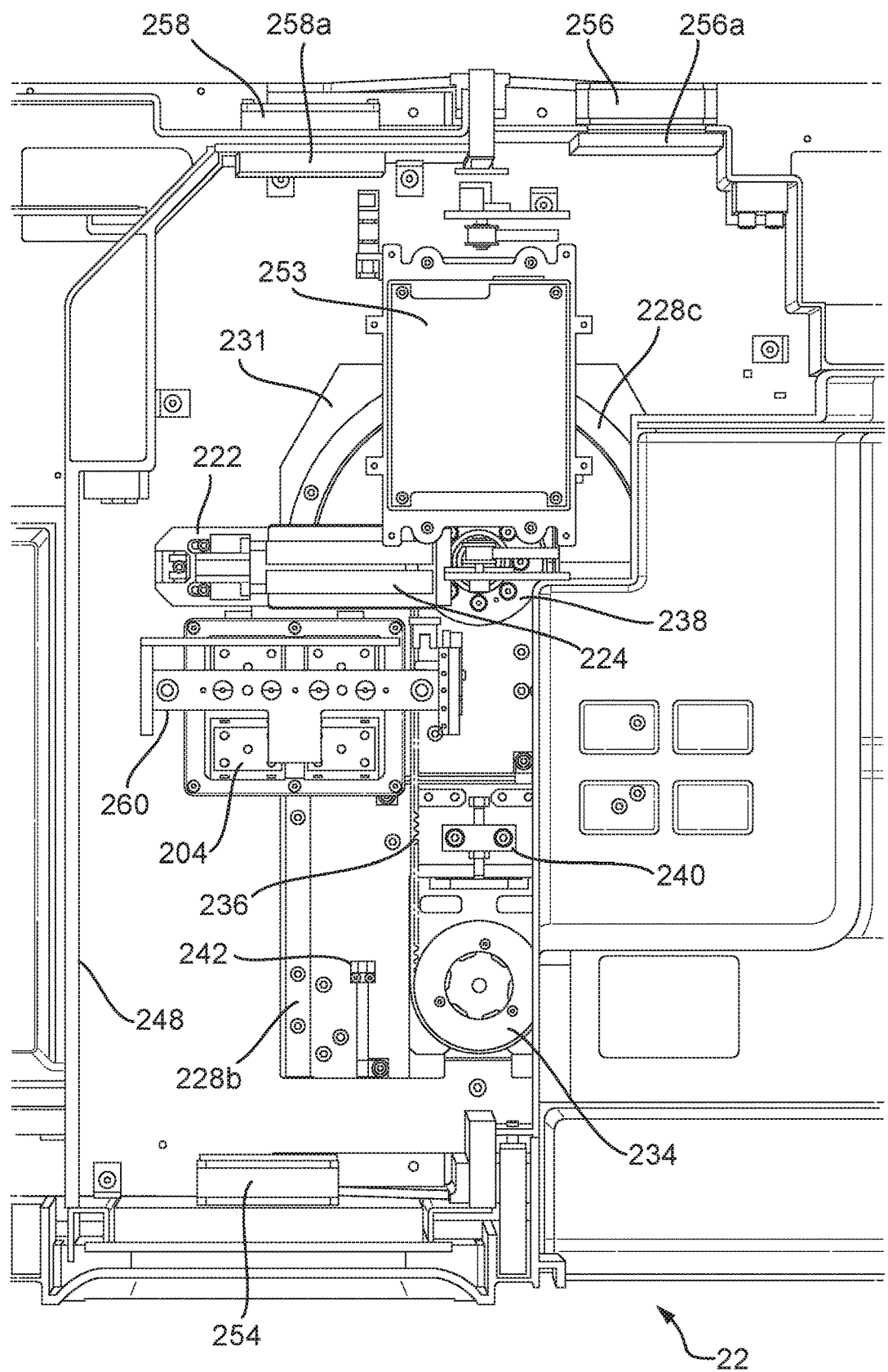
FIG. 10 shows a still further plan view of the example sterilisation assembly.
Figure 11:
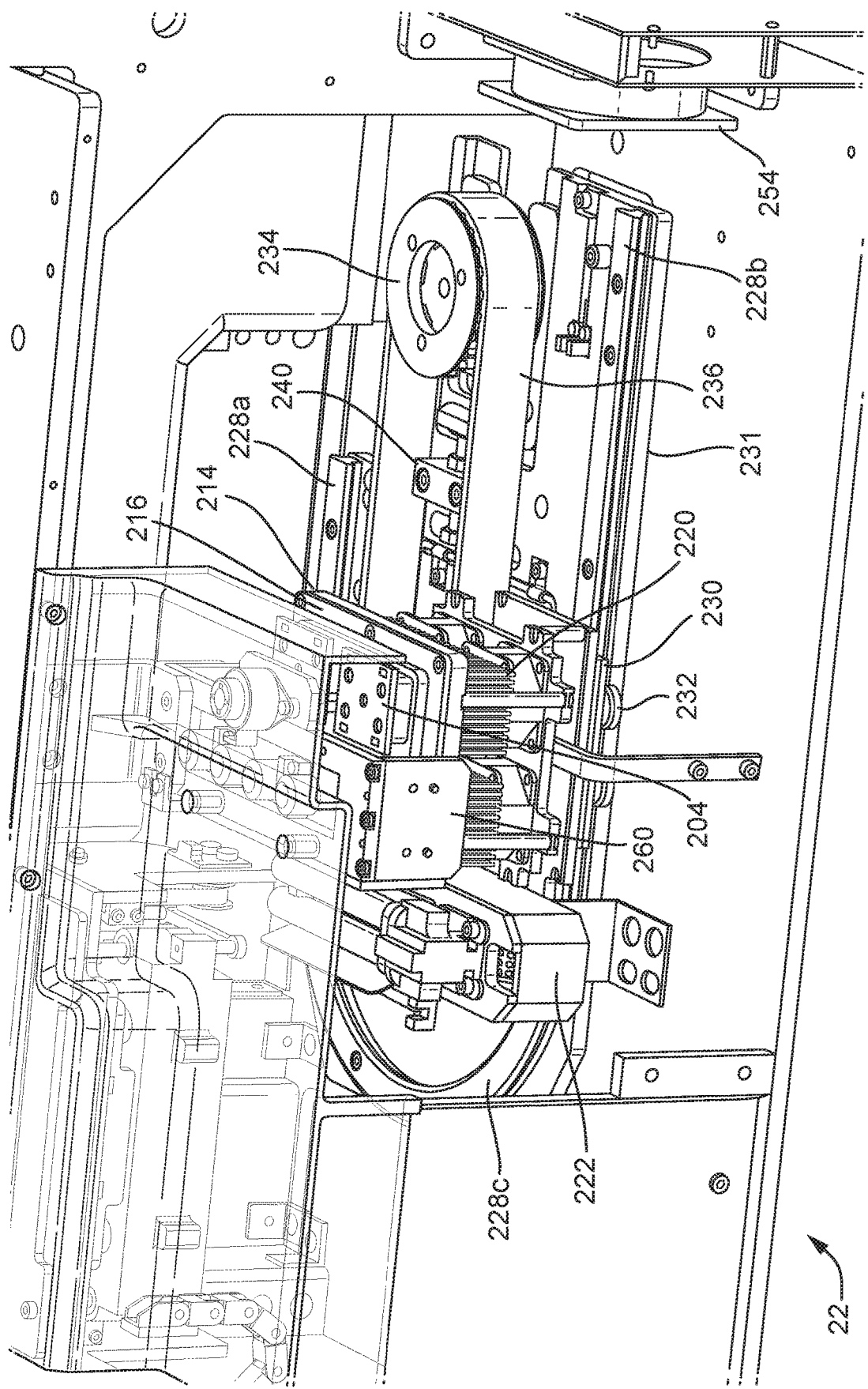
FIG. 11 shows a still further sectional view of the example sterilisation assembly.

The stage is shown in the sample unloading position in FIG. 10 and FIG. 11. This also shows the guide platform 260 used in some examples to assist with unloading sample from the cartridges.

In this example, unloading the sample from the cartridges 204 is achieved by lowering a pipette tip through the second openings 208 into each of four wells and aspirating sample from the respective wells. As with the loading of the sample into the cartridges, in this example, the sample is unloaded from the cartridges four wells at a time, these four wells being arranged in a single line. This means that two wells in one cartridge are emptied (or filled) at the same time as two wells in an adjacent cartridge. The cartridges may be loaded with sample and unloaded in a different manner in other examples.

During the sample unloading process, when the stage is positioned in the sample unloading position, air is being drawn through the enclosure 202. At this stage the intake fan 254 is drawing air into the enclosure and the second outlet fan 258 is extracting air from the enclosure.

Once the sample is unloaded to the third zone 30, the detection stage of the assay is carried out on the sample in the third zone, step 1020. In this example, the detection stage takes approximately an hour to complete.

Once the sample is unloaded from the cartridges 204, the stage 214 is moved along the length of the rail 228 between the sample loading position and the cartridge loading position sterilising the walls of the enclosure 202 that provide the tunnel defining the passage the stage is located in, step 1022. This is achieved by the decontaminator 222 emitting UVC light.

The inward surface of the tunnel walls are polyurethane. This causes contaminants to condense on to the walls of the tunnel. In this example this occurs due to the natural roughness of the polyurethane, which is sufficiently rough to capture airborne contaminants that come into come into contact with the tunnel walls. The condensing process may be achieved by another mechanism in other examples.

In this example, air is caused to come into contact with the tunnel walls due to movement of the air provided by the fans and due to air also being entrained at the first openings 204 and the second openings 208 from the first zone 10 and third zone respectively. This in part is due to this air movement, along with the U shape of the tunnel causing air turbulence, thereby circulating the air and any contamination being carried by the air. In other examples, this may be achieved by other methods.

The orientation of the stage 214 relative to the rail 228 means the decontaminator 222 is located on a side of the stage proximal to the curved rail section 228c when the stage is located at the cartridge loading position and distal to the curved rail section when the stage is located at the sample loading position. In other examples a different arrangement or orientation of the stage and decontaminator are able to be used.

Once the stage has passed through the passage to sterilise the tunnel, the stage is returned to the cartridge loading position and the cartridges 204 on the stage are replaced with new cartridges by the user, step 1024. This is achieved by the same process as the first set of cartridges are loaded on to the stage as set out in relation to step 1002 above. Steps 1012 to 1024 can be repeated for the further sample set, and a yet further sample set (i.e. a third sample set) can also be loaded into the analyser 1 by the user for analysis by following the steps set out above.

While sufficient materials are present in the analyser (pipette tips, reagents and any other consumable components used in assay) sample sets can continue to be analysed. This is achieved by up to three sample sets undergoing the assay at any one time with one sample set in each of the respective first zone 10, second zone 20 and third zone 30. As set out above, cross contamination between sample sets is limited by the sterilisation process described above and barriers between the zones.

In the example shown in the figures, the analyser 1 is sized to fit on a laboratory bench. Accordingly, the analyser is about 1.80 metres (m) wide (from one side to the other) and about 0.75 m deep.

Figure 12:
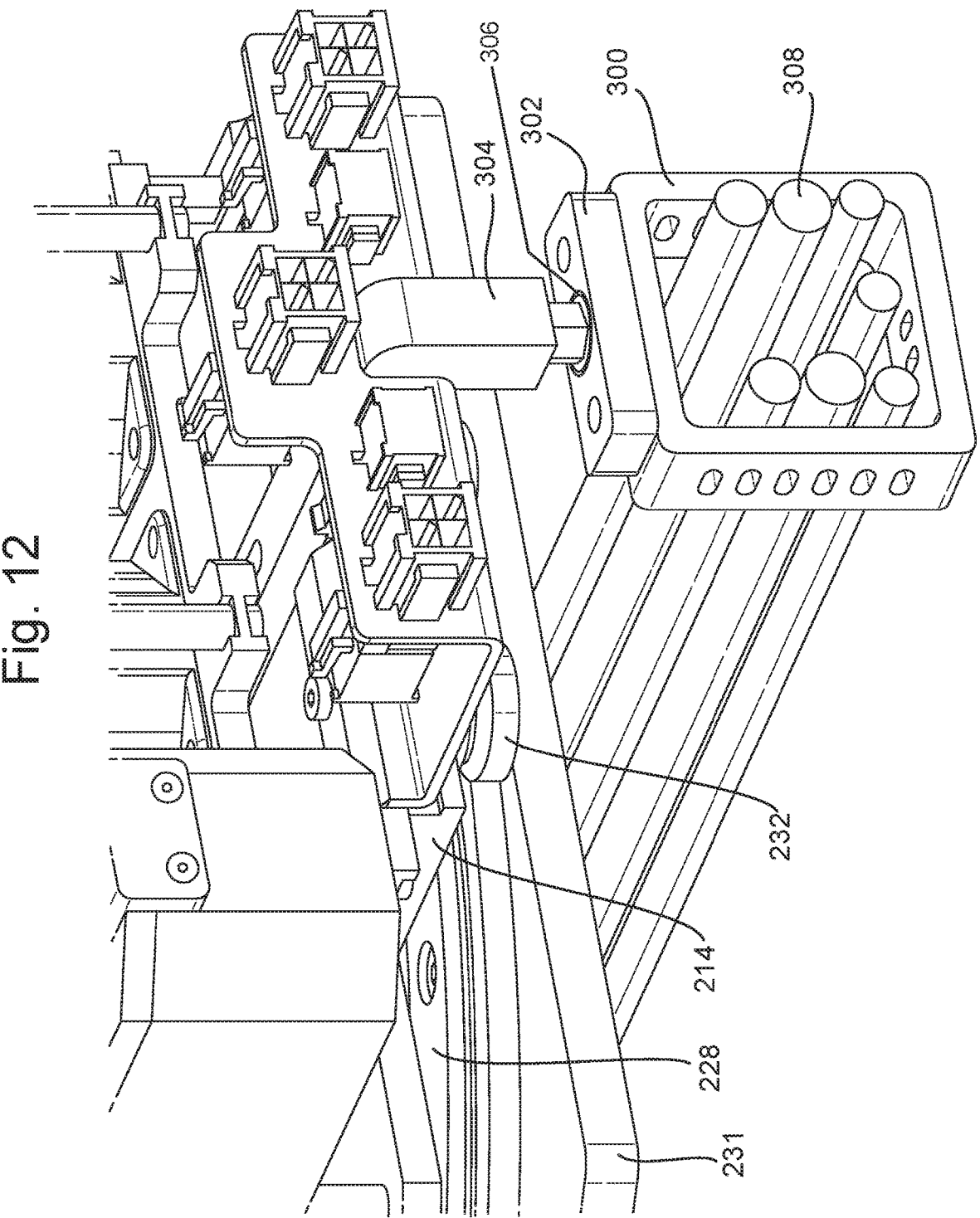
FIG. 12 shows an example linear motion system.

FIG. 12 shows a portion of the second zone 20 of the analyser shown in the other figures and described in detail above. However, the details of the example shown in FIG. 12 are applicable to systems other than molecular diagnostic assay analysers, and indeed are applicable to a number of industrial sectors.

In FIG. 12, the stage 214 is shown mounted to the rail 228. This forms a linear motion system, and which system functions with or without the various components set out above applicable in the context of an analyser. The example of an analyser is used by reference to the example shown in FIG. 12 for ease of reference as well as being applicable to an analyser in some examples. The rail is mounted on platform 231.

In view of the stage 214 and rail 228 forming a linear motion system, the stage is also able to be referred to as a carriage and the rail is able to be referred to as a track. As set out in relation to the examples shown in earlier figures, the stage has rollers 232 providing an interface between the stage and rail to assist with movement of the stage relative to the rail in use and to guide said movement.

In this example, as shown in FIG. 12, the stage 214 is connected to a bracket 300. The connection between the stage and bracket is provided by a joint 302. The joint is also able to be referred to as a swivel joint.

The joint 302 is an inverted "T" shape in this example. A rotary bearing 304 is located at the join between the stem 306 and bar of the "T". The bearing is orientated so the stem of the "T" is able to rotate about its longitudinal axis and the bar of the "T" is able to rotate about a radial axis.

The stem 306 is connected to the stage 214 so that, in this example, in use, the position and orientation of the stem is fixed relative to the stage. The bar of the joint 302 is connected to the bracket 300 so that, in this example, in use, the position and orientation of the stem is fixed relative to the bracket. Due to the bearing 304, this allows the bracket to rotate relative to the stage.

The bracket 300 in this example is provided by a square ring. In other examples, the ring may be different shapes (such as a circle) and/or may be a partial ring instead of the full ring as is the case in this example. The bar of the joint 302 is connected to one side of the square on a radially outer side of the ring. In this arrangement, a longitudinal axis of the bracket is (approximately) parallel to a plane in which the longitudinal axis of the track 228 is located.

FIG. 12 shows a plurality of cables 308 passing through the square ring of the bracket 300. In the example shown in FIG. 12 the cables are individual cables. These cables may be each be a single core or a multicore cable. In other examples there is only a single multicore cable.

Regardless of whether there is only a single cable 308 or a plurality of cables, in the example shown in FIG. 12, the bracket 300 supports the cable(s) providing sides against which the cable(s) is able to abut but move between in use due to movement of the cable(s) as it moves on movement of the carriage. This form of support also allows the longitudinal axis of the cable end(s) passing through the bracket to change orientation relative to the bracket in view of the cable(s) moving relative to the bracket.

Additionally, the cable(s) 308 may move longitudinally relative to the bracket 300 in some examples. This longitudinal movement is however anticipated as not being a significant amount of movement. This is primarily due to a connection between the cable end(s) to the stage 214.

In FIG. 12 the cables 308 shown appear to end at one side of the bracket. However, this is only due to the figure showing a sectional view. The cables (or in the case of one or more multicore cables, the cores) each connect to a component mounted on the stage 214. This connection is provided by suitable connectors (not shown) at each component.

The section of the rail 228 shown in FIG. 12 is a curved section (in this example corresponding to and as identified by reference numeral 228c in the examples shown in other figures). Consistent with the other figures, the curve is a 180° curve that has a smooth (also referred to as "continuous") curve.

In FIG. 12, the stage 214 is shown at the apex of the curve of the rail 228. In this position the portion of the cable(s) 308 (this/these portion(s) providing a cable end(s)) passing through the bracket 300 is at its greatest distance from the connection of the cable to the analyser at an opposing end of the cable. This connection (not shown) is fixed, holding the cable(s) end in position. Although not shown, in various examples, this end of the cable connects through the base (not shown) of the second zone of the analyser and connects to various processing, analysis and/or controller units. The base is located below an underside of the platform 231, which is separated from the base to allow space for the cabling.

Returning to the example shown in FIG. 12, due to the fixing of the cables 308 to the base, as the stage 214 moves along the rail 228 (whether just along the curved portion 228c, or along the straight sections 228a, 228c as well or as an alternative to the curved portion) the cables need to flex to follow the movement of the stage. The flexing causes the cables to bend. Since the bracket 300 is able to rotate relative to the stage due to the joint 302, the longitudinal axis of the cables at the cable ends at the bracket do not always need to be perpendicular to the longitudinal axis of the rail. Instead, this axis is able to change orientation relative to the longitudinal axis of the rail to allow the cable to bend (i.e. to deform) as little as possible.

To further reduce the amount of bending the cables 308 needs to undergo, in this example, the bracket 300 is connected by the joint 302 to the stage 214 at an outer side of the stage relative to the rail 228 (i.e. at a distal side of the rail to smaller radius side of the rail on the curved section of the rail).

By using this combination of features described in this example (i.e. the example shown in FIG. 12), the radius of the curve of the rail 228 is able to be kept between about 400 mm and 500 mm while using a multicore cable with an outer diameter of 15 mm. This allows the cable to be un-guided, as would be required or at least applied in other linear motion systems by the use of a cable guide, cable carrier or cable chain. This is while also allowing the cable not to need to bend beyond its minimum bend radius due to the cables natural resistance to bending beyond its minimum bend radius when little or no external force is applied, which is the case in the example shown in FIG. 12 (but would not be the case if the bracket 300 were fixed in position relative to the stage 214).

The stage 214 shown in FIG. 12 is moved by the same means as the stage is moved in the earlier figures.

The invention claimed is:

1. A sterilisation assembly for a molecular diagnostic assay analyser, the sterilisation assembly comprising:
   an enclosure having a passage therethrough, the passage to allow an assay sample set to pass through the enclosure, the enclosure defining a barrier to restrict fluid communication across the enclosure to communication through the passage; and
   a decontaminator located within the passage, the decontaminator to sterilise contamination in the passage;
   a moveable stage to removably mount at least one sample;
   wherein the moveable stage is to move along a path through the passage, the decontaminator being attached to the moveable stage.

2. The sterilisation assembly according to claim 1, wherein the passage is defined by a tunnel forming part of the enclosure.

3. The sterilisation assembly according to claim 2, wherein an inwardly facing surface of the tunnel is polyurethane.

4. The sterilisation assembly according to claim 1, further comprising an elevated platform in the passage, the moveable stage being connected to an electrical cable, the cable passing under the elevated platform.

5. The sterilisation assembly according to claim 4, wherein the cable has a swivel joint.

6. The sterilisation assembly according to claim 1, wherein the moveable stage is arranged to move along a rail.

7. The sterilisation assembly according to claim 1, further comprising a drive mechanism arranged to move the moveable stage.

8. The sterilisation assembly according to claim 7, wherein the drive mechanism comprises a belt to which the moveable stage is attached.

9. The sterilisation assembly according to claim 1, wherein the decontaminator is attached to the moveable stage.

10. The sterilisation assembly according to claim 9, wherein the moveable stage is orientated with at least one side crossing the path, the decontaminator being attached at a side of the moveable stage crossing the path.

11. The sterilisation assembly according to claim 10, wherein the moveable stage is moveable between a first position and a second position, when the moveable stage is located at the first position, the side of the moveable stage to which the decontaminator is attached is distal to the second position.

12. The sterilisation assembly according to claim 1, wherein the passage is accessible by one or more openings, each opening having an area of less than or equal to the area of an upper surface of the moveable stage.

13. The sterilisation assembly according to claim 1, wherein the passage includes at least one turn.

14. The sterilisation assembly according to claim 13, wherein the turn changes the direction of the passage by an angle greater than an acute angle.

15. The sterilisation assembly according to claim 14, wherein the turn is U shaped.

16. The sterilisation assembly according to claim 1, further comprising a pump arranged to move gas within the passage.

17. The sterilisation assembly according to claim 16, wherein the enclosure includes an outlet connected to the pump.

18. The sterilisation assembly according to claim 17, wherein the outlet comprises a filter.

19. The sterilisation assembly according to claim 16, wherein the enclosure includes an inlet connected to the pump.

20. The sterilisation assembly according to claim 19, wherein the inlet comprises a filter.

21. The sterilisation assembly according to claim 16, wherein the pump comprises at least one fan.

22. The sterilisation assembly according to claim 1, wherein the decontaminator is arranged to produce electromagnetic radiation to provide radiation sterilisation.

23. The sterilisation assembly according to claim 22, wherein the electromagnetic radiation is Ultraviolet C (UVC) radiation.

* * * * *